(12) United States Patent
Saito

(10) Patent No.: US 8,941,738 B2  
(45) Date of Patent: Jan. 27, 2015

(54) VEHICLE EXTERIOR MONITORING DEVICE AND VEHICLE EXTERIOR MONITORING METHOD

(75) Inventor: Toru Saito, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 495 days.

(21) Appl. No.: 13/416,139

(22) Filed: Mar. 9, 2012

(65) Prior Publication Data

US 2012/0242799 A1    Sep. 27, 2012

(30) Foreign Application Priority Data

Mar. 22, 2011    (JP) .................................. 2011-061901

(51) Int. Cl.

| | |
|---|---|
| H04N 13/02 | (2006.01) |
| G01S 7/48 | (2006.01) |
| G01S 11/12 | (2006.01) |
| G01S 17/89 | (2006.01) |
| G06K 9/00 | (2006.01) |

(52) U.S. Cl.
CPC ............. *G01S 7/4802* (2013.01); *G01S 11/12* (2013.01); *G01S 17/89* (2013.01); *G06K 9/00825* (2013.01); *G06K 9/00791* (2013.01)
USPC ...................................................... 348/148

(58) Field of Classification Search
USPC ...................................................... 348/148
See application file for complete search history.

(56) References Cited

U.S. PATENT DOCUMENTS

2009/0190323 A1*    7/2009    Watanabe et al. ............... 362/37

FOREIGN PATENT DOCUMENTS

| JP | 10-283461 A | 10/1998 |
|---|---|---|
| JP | 3349060 B2 | 11/2002 |

* cited by examiner

*Primary Examiner* — Sath V Perugavoor  
*Assistant Examiner* — Jeffery Williams  
(74) *Attorney, Agent, or Firm* — McDermott Will & Emery LLP

(57) ABSTRACT

A vehicle exterior monitoring device obtains position information of a three-dimensional object present in a detected region, divides the detected region with respect to an horizontal direction into plural first divided regions, derives a first representative distance corresponding to a peak in distance distribution of each first divided region based on the position information, groups the first divided regions based on the first representative distance to generate one or more first divided region groups, divides the first divided region group with respect to a vertical direction into plural second divided regions, groups second divided regions having relative distances close to the first representative distance to generate a second divided region group, and limits a target range for which the first representative distance is derived within the first divided region group in which the second divided region group is generated to a vertical range corresponding to the second divided region group.

11 Claims, 15 Drawing Sheets

VEHICLE EXTERIOR MONITORING DEVICE AND VEHICLE EXTERIOR MONITORING METHOD

CROSS-REFERENCE TO RELATED APPLICATIONS

The present application claims priority from Japanese Patent Application No. 2011-061901 filed on Mar. 22, 2011, the entire contents of which are hereby incorporated by reference.

BACKGROUND OF THE INVENTION

1. Field of the Invention

The present invention relates to a vehicle exterior monitoring device and a vehicle exterior monitoring method for monitoring vehicle exterior condition based on distribution of distances of three-dimensional objects outside of a subject vehicle to the subject vehicle.

2. Description of Related Art

There have been known technologies for detecting a three-dimensional object such as a vehicle located ahead of a subject vehicle (such as a preceding vehicle and a vehicle stopping ahead) and an obstacle, and controlling to avoid collision with the detected three-dimensional object and keeping the inter-vehicle distance to the preceding vehicle at a safe distance (for example, see Japanese Patent No. 3349060 and Japanese Patent Application Laid-Open (JP-A) No. 10-283461).

In such technologies, a relative three-dimensional position (position information) of a three-dimensional object located ahead including a relative distance to the subject vehicle is derived by using a distance sensor or the like to identify the object. However, the distance sensor itself for detecting a relative distance generally cannot recognize what object the detected part belongs to. Accordingly, the three-dimensional position of the detected part is derived independently in units of detection resolution in a detected area instead of in units of an object. Therefore, a process will be required that extracts and groups positional information of adjacent three-dimensional positions in units of detection resolution, and identifies the positional information group as a three-dimensional object.

With the technologies of Japanese Patent No. 3349060 and JP-A No. 10-283461 mentioned above, a detected region is first divided into a plurality of strip-shaped divided regions, and for each of the divided regions, detected position information is statistically processed to obtain distance distribution, and a relative distance corresponding to a peak in the distance distribution is obtained as a representative value (representative distance) in the divided region. Then, the representative distances are compared to each other to be grouped as a three-dimensional object.

In the grouping process performed in the technologies of Japanese Patent No. 3349060 and JP-A No. 10-283461 described above, the region is divided into strip-shaped divided regions extending in the vertical direction because a rearmost preceding vehicle on a road can be uniquely identified in a divided region. In addition, the relative distance corresponding to a peak in the distance distribution is used as the representative distance so as to exclude unexpected position information as a result of false detection.

However, a plurality of relative distances may be detected in a strip-shaped region for one integrated three-dimensional object. For example, in a vehicle such as a truck, relative distances of a cabin part and a rear side of a cargo bed to the subject vehicle are different, and accordingly, two relative distances of the cabin part and the rear side of the cargo bed are mainly detected in the distance distribution within the strip-shaped region.

In this case, since the relative distance corresponding to a peak in the distance distribution of a divided region is the representative distance in the technologies of Japanese Patent No. 3349060 and JP-A No. 10-283461 mentioned above, the distance distribution may change depending on a detected condition such as areas covered by the cabin part and the rear side of the cargo bed and the number of parts that can be detected.

The relative distance corresponding to a peak may change with such change in the distance distribution, and it may thus be difficult to specify what part has the relative distance corresponding to the representative distance. Then, the cabin part and the rear side of the cargo bed cannot be grouped as one three-dimensional object and the three-dimensional object may not be correctly recognized. For example, when the relative distance of the cabin part and the relative distance of the rear side of the cargo bed are detected successively in time as the relative distance to the three-dimensional object, this may lead to the following situation. The subject vehicle may react faithfully to the change in the relative distance of the preceding vehicle through control (cruise control) for keeping the inter-vehicle distance to the preceding vehicle to be safe, and the passengers may feel uncomfortable with the acceleration or deceleration of the subject vehicle.

SUMMARY OF THE INVENTION

In view of such disadvantages, the present invention aims to provide a vehicle exterior monitoring method and a vehicle exterior monitoring method capable of specifying a required relative distance and correctly recognize a three-dimensional object even when there is a plurality of relative distances that are peak candidates in distance distribution within a divided region.

To overcome the disadvantages, an aspect of the present invention provides a vehicle exterior monitoring device that includes: a position information obtaining unit that obtains position information of a three-dimensional object present in a detected region, the position information including a relative distance with respect to a subject vehicle; a first representative distance deriving unit that divides the detected region with respect to an horizontal direction into a plurality of first divided regions, and derives a first representative distance corresponding to a peak in distance distribution of each of the first divided regions based on the position information; a first divided region group generating unit that groups the first divided regions based on the first representative distance to generate one or more first divided region groups; and a second divided region group generating unit that divides the first divided region group with respect to the vertical direction into a plurality of second divided regions and groups second divided region groups having relative distances close to the first representative distance to generate a second divided region group. The first representative distance deriving unit limits a target range for which the first representative distance is derived within the first divided region group in which the second divided region group is generated to a vertical range corresponding to the second divided region group.

The second divided region group generating unit may group the second divided regions when a predetermined proportion of relative distances close to the first representative distance with respect to the total number of relative distances in the second divided region are included.

To overcome the disadvantages, another aspect of the present invention provides a vehicle exterior monitoring device that includes: a position information obtaining unit that obtains position information of a three-dimensional object present in a detected region, the position information including a relative distance with respect to a subject vehicle; a first representative distance deriving unit that divides the detected region with respect to an horizontal direction into a plurality of first divided regions, and derives a first representative distance corresponding to a peak in distance distribution of each of the first divided regions based on the position information; a first divided region group generating unit that groups the first divided regions based on the first representative distance to generate one or more first divided region groups; a second representative distance deriving unit that divides the first divided region group with respect to a vertical direction into a plurality of second divided regions, and derives a second representative distance corresponding to a peak in distance distribution of each of the second divided regions based on the position information; and a second divided region group generating unit that groups the second divided region groups based on the second representative distance to generate a second divided region group that has a relative distance that is the shortest and whose difference from the first representative distance is equal to or smaller than a first threshold. The first representative distance deriving unit limits a target range for which the first representative distance is derived within the first divided region group in which the second divided region group is generated to a vertical range corresponding to the second divided region group.

To overcome the disadvantages, another aspect of the present invention provides a vehicle exterior monitoring device that includes: a position information obtaining unit that obtains position information of a three-dimensional object present in a detected region, the position information including a relative distance with respect to a subject vehicle; a first representative distance deriving unit that divides the detected region with respect to an horizontal direction into a plurality of first divided regions, and derives a first representative distance corresponding to a peak in distance distribution of each of the first divided regions based on the position information; a first divided region group generating unit that groups the first divided regions based on the first representative distance to generate one or more first divided region groups; and a second divided region group generating unit that divides the first divided region group with respect to the vertical direction into a plurality of second divided regions, and exclusively performs a process of grouping second divided region groups having relative distances close to the first representative distance to generate a second divided region group and a process of grouping the second divided regions based on a second representative distance corresponding to a peak in distance distribution of each of the second divided regions to generate a second divided region group having a relative distance that is the shortest and whose difference from the first representative distance is equal to or smaller than a first threshold. The first representative distance deriving unit limits a target range for which the first representative distance is derived within the first divided region group in which the second divided region group is generated to a vertical range corresponding to the second divided region group.

The first representative distance deriving unit may limit the target range to the respective vertical range independently for each of the first divided region group in which the second divided region group is generated.

The first representative distance deriving unit may use any one of an average value of relative distances within the vertical range, a median of relative distances within the vertical range and a shortest relative distance within the vertical range as the first representative distance.

The second divided region group generating unit may set the vertical range to a range that is extended by a predetermined area.

The second divided region group generating unit may set the vertical range to a range extended to a lower end of the first divided region group.

The second divided region group generating unit may update the vertical range when the first representative distance is equal to or larger than a second threshold.

To overcome the disadvantages, another aspect of the present invention provides a vehicle exterior monitoring method that includes: obtaining position information of a three-dimensional object present in a detected region, the position information including a relative distance with respect to a subject vehicle; dividing the detected region with respect to a horizontal direction into a plurality of first divided regions; deriving a first representative distance corresponding to a peak in distance distribution of each of the first divided regions based on the position information; grouping the first divided regions based on the first representative distance to generate one or more first divided region groups; dividing the first divided region group with respect to the vertical direction into a plurality of second divided regions and grouping second divided region groups having relative distances close to the first representative distance to generate a second divided region group; and limiting a target region for which the first representative distance is derived within the first divided region group in which the second divided region group is generated to a vertical range corresponding to the second divided region group.

To overcome the disadvantages, another aspect of the present invention provides a vehicle exterior monitoring method that includes: obtaining position information of a three-dimensional object present in a detected region, the position information including a relative distance with respect to a subject vehicle; dividing the detected region with respect to a horizontal direction into a plurality of first divided regions; deriving a first representative distance corresponding to a peak in distance distribution of each of the first divided regions based on the position information; grouping the first divided regions based on the first representative distance to generate one or more first divided region groups; dividing the first divided region group with respect to a vertical direction into a plurality of second divided regions, and deriving a second representative distance corresponding to a peak in distance distribution of each of the second divided regions based on the position information; grouping the second divided region groups based on the second representative distance to generate a second divided region group that has a relative distance that is the shortest and whose difference from the first representative distance is equal to or smaller than a first threshold; and limiting a target region for which the first representative distance is derived within the first divided region group in which the second divided region group is generated to a vertical range corresponding to the second divided region group.

According to the present invention, a required relative distance can be specified, a three-dimensional object can be correctly recognized and processing load can be reduced by limiting a detection range even when there is a plurality of relative distances that are peak candidates in distance distribution within a divided range.

DETAILED DESCRIPTION OF THE PREFERRED EMBODIMENTS

Preferred embodiments of the present invention will be described in detail below with reference to the accompanying drawings. Sizes, materials, specific numerical values and the like presented in the embodiments are only examples for easier understanding of the present invention and do not limit the present invention unless otherwise specified. Note that elements having substantially the same functions and configurations will be identified by the same numerals, redundant description will be omitted in the present specification and drawings, and elements that are not directly related to the present invention will not be shown.

(Vehicle Exterior Monitoring System 100)

Figure 1:
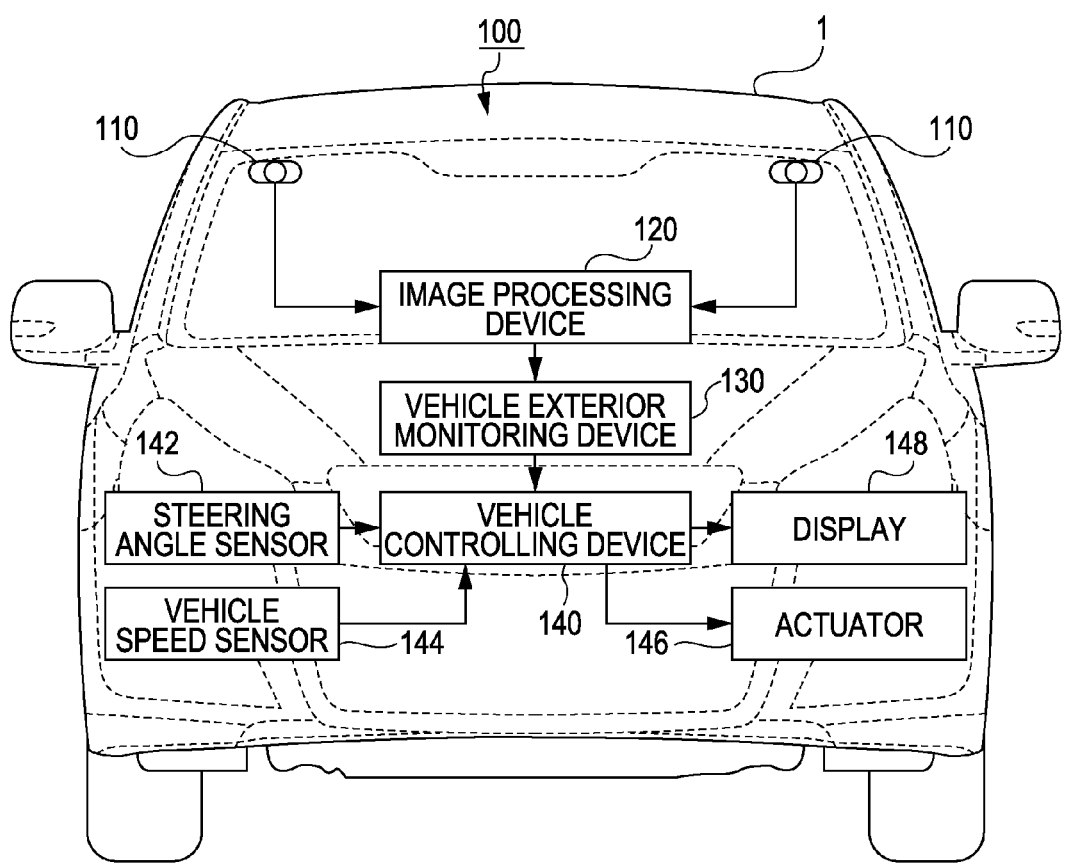
FIG. 1 is a block diagram showing a relationship of a connection in a vehicle exterior monitoring system.

FIG. 1 is a block diagram showing a relationship of a connection in a vehicle exterior monitoring system 100. The vehicle exterior monitoring system 100 includes a plurality of (two in the present embodiment) image capturing devices 110, an image processing device 120, a vehicle exterior monitoring device 130 and a vehicle exterior controlling device 140, which are disposed in a vehicle 1.

The image capturing devices 110 each include an image device such as a charge-coupled device (CCD) and a complementary metal-oxide semiconductor (CMOS). The image capturing devices 110 are arranged with a space substantially in the horizontal direction so that optical axes of the two image capturing devices 110 are substantially in parallel in the traveling direction of the vehicle 1. The image capturing devices 110 continuously generate image data obtained by capturing an image of a three-dimensional object present in a detected region ahead of the vehicle 1 at 1/60 seconds (60 fps), for example. Functional units in the following embodiments perform respective processes with the update of the image data as a trigger.

The image processing device 120 obtains image data from each of the two image capturing devices 110, and derives parallax information containing a parallax of any block (a group of a predetermined number of pixels) in the images and a screen position indicating a position of the block on a screen based on the two image data. The image processing device 120 derives the parallax by using so-called pattern matching that searches one image data for a block corresponding to any block (an array of horizontal 4 pixels×vertical 4 pixels, for example) extracted from the other image data. The horizontal direction refers to the lateral direction on the screen and corresponds to the horizontal direction in the real space, while the vertical direction refers to the vertical direction on the screen and corresponds to the vertical direction in the real space.

The pattern matching may be performed by comparing luminance values (Y color difference signals) in units of a block representing a given image position between two image data.

For example, there are techniques such as a sum of absolute difference (SAD) determining a difference between the luminance values, a sum of squared intensity difference (SSD) using the square of the difference, and normalized cross correlation (NCC) determining a similarity of variances obtained by subtracting an average value from luminance values of the pixels. The image processing device 120 performs such a parallax deriving process in units of a block on all blocks displayed in a detected region (600 pixels×200 pixels, for example). Although it is assumed herein that a block has a size of 4 pixels×4 pixels, the number of pixels in a block can be set to any value.

Note that the image processing device 120 can derive a parallax for each block that is a unit of detection resolution but cannot recognize what three-dimensional object the block belongs to. Therefore, the parallax information is not derived in units of a three-dimensional object but derived independently in units of detection resolution in a detected region. Herein, an image in which the parallax information derived in this manner is associated with image data is referred to as a distance image.

Figure 2A:
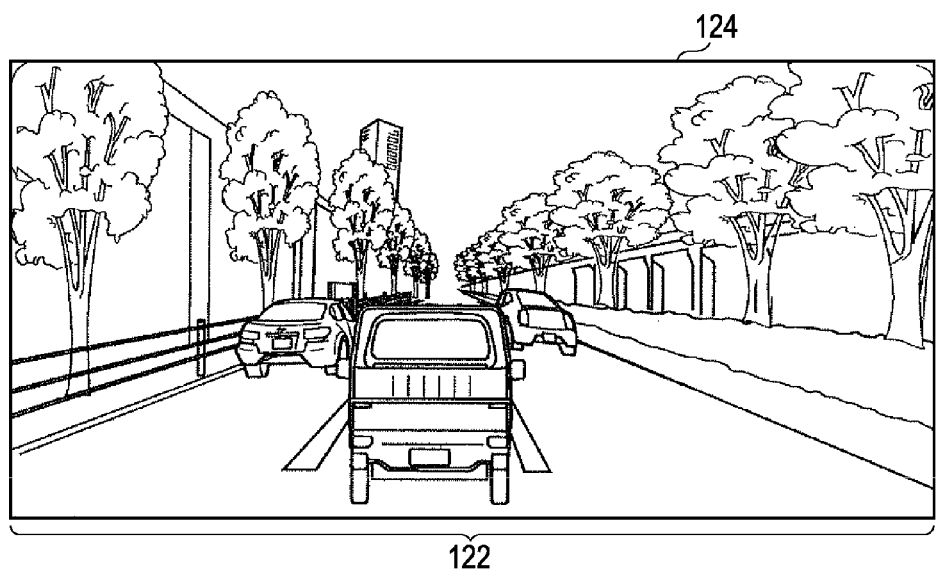
FIGS. 2A and 2B are explanatory views for explaining a distance image.
Figure 2B:
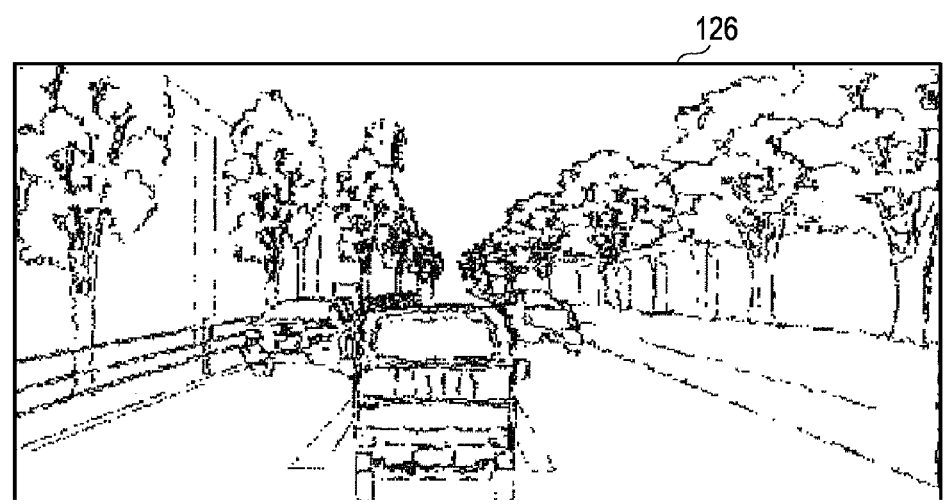

FIGS. 2A and 2B are explanatory views for explaining the distance image. For example, it is assumed that a captured image (image data) 124 as shown in FIG. 2A is generated for a detected region 122 with the two image capturing devices 110. Note that herein only one of the two image data is shown schematically and description will be made on the assumption that an aspect ratio is about 2:1 for easier understanding. The image processing device 120 obtains a parallax for each block from such a captured image 124, and generates a distance image 126 as shown in FIG. 2B. Each block in the distance image 126 is associated with a parallax of the block. A block for which a parallax is derived is expressed by a black dot for convenience of description.

The parallax is easily defined in an edge portion (a portion where the difference in brightness is large between adjacent pixels) of an image. Thus, blocks for which parallaxes are derived with black dots in the distance image 126 are likely to be those of edges in the original captured image 124. Accordingly, the original captured image 124 shown in FIG. 2A and the distance image 126 shown in FIG. 2B are similar to each other.

The vehicle exterior monitoring device 130 identifies a road shape or a three-dimensional object outside of the vehicle 1 by converting parallax information (distance image 126) for each block in the detected region 122 derived by the image processing device 120 into three-dimensional position information containing a relative distance using the so-called stereo method. The stereo method is a method of deriving relative distances of a three-dimensional object to the image capturing devices 110 from the parallax of the three-dimensional object by using the triangulation method. Such a vehicle exterior monitoring device 130 will be described in detail later.

The vehicle exterior controlling device 140 performs control to avoid collision with a three-dimensional object identified by the vehicle exterior monitoring device 130 and to keep the inter-vehicle distance to a preceding vehicle at a safe distance. Specifically, the vehicle exterior controlling device 140 obtains a current traveling condition of the vehicle 1 by means of a steering angle sensor 142 for detecting the angle of steering, a vehicle speed sensor 144 for detecting the speed of the vehicle 1 and the like, and controls an actuator 146 to keep the inter-vehicle distance to a preceding vehicle at a safe distance. In case of a possible collision with a three-dimensional object, the vehicle exterior controlling device 140 also displays (informs) a warning of the possible collision on a display 148 installed in front of the driver and controls the actuator 146 to automatically brake the vehicle 1. Such a vehicle exterior controlling device 140 can also be provided integrally with the vehicle exterior monitoring device 130.

(Vehicle Exterior Monitoring Device 130)

Figure 3:
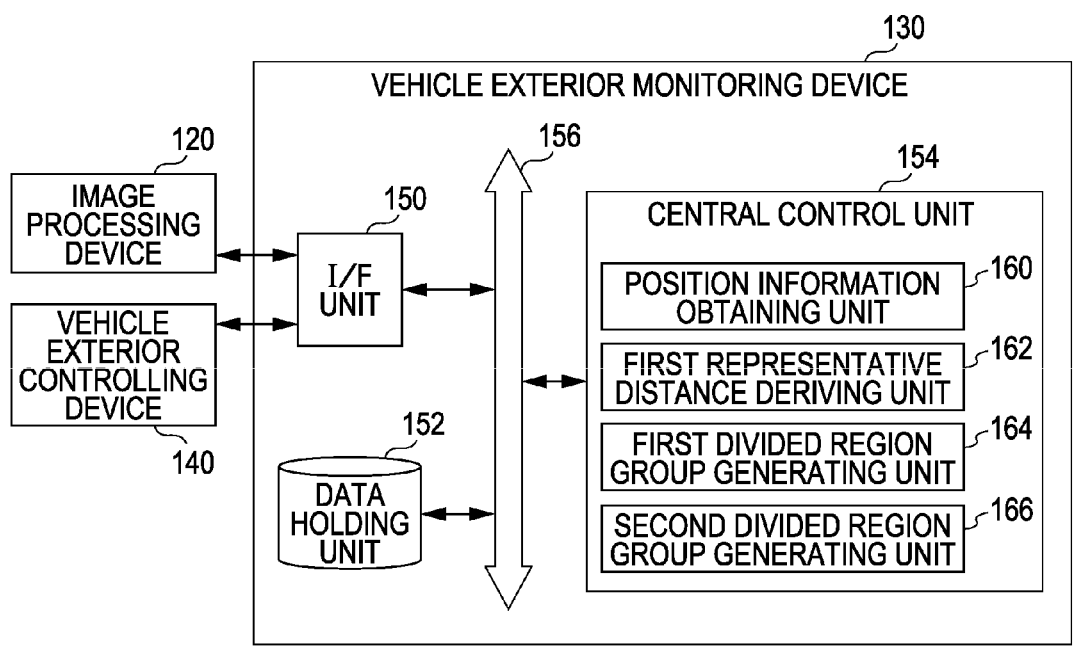
FIG. 3 is a functional block diagram showing general functions of a vehicle exterior monitoring device according to a first embodiment.

FIG. 3 is a functional block diagram showing general functions of the vehicle exterior monitoring device 130. As shown in FIG. 3, the vehicle exterior monitoring device 130 includes an interface (I/F) unit 150, a data holding unit 152 and a central control unit 154.

The I/F unit 150 is an interface for allowing the image processing device 120 and the vehicle exterior controlling device 140 to exchanging information with each other. The data holding unit 152 is constituted by a RAM, a flash memory, an HDD or the like, and temporarily holds the parallax information (distance image 126) received from the image processing device 120 and various information required for processing performed by later-described functional units.

The central control unit 154 is a semiconductor integrated circuit including a central processing unit (CPU), a ROM storing programs and the like, a RAM as a work area, and the like, and controls the I/F unit 150 and the data holding unit 152 via a system bus 156. In the present embodiment, the central control unit 154 also functions as a position information obtaining unit 160, a first representative distance deriving unit 162, a first divided region group generating unit 164, and a second divided region group generating unit 166.

The position information obtaining unit 160 converts the parallax information for each block in the detected region 122 derived by the image processing device 120 into the three-dimensional position information containing the relative distance by using the stereo method.

Figure 4:
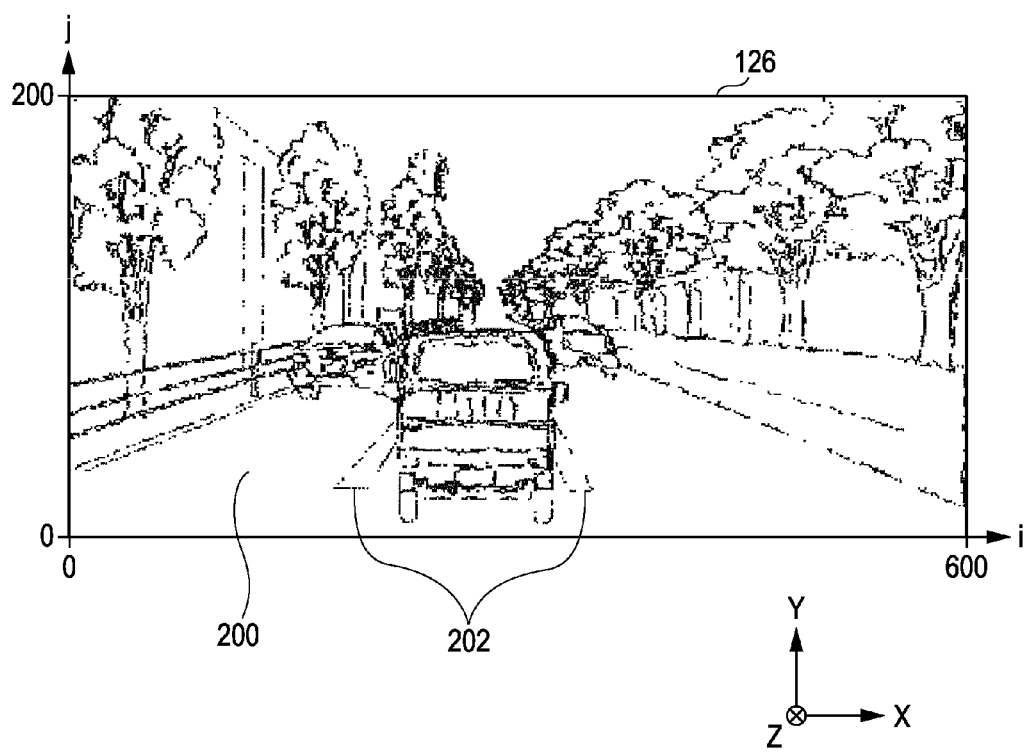
FIG. 4 is an explanatory view for explaining a conversion to three-dimensional position information performed by a position information obtaining unit.

FIG. 4 is an explanatory view for explaining the conversion into the three-dimensional position information performed by the position information obtaining unit 160. The position information obtaining unit 160 first recognizes the distance image 126 as a coordinate system in units of a pixel as shown in FIG. 4. In FIG. 4, the lower-left corner is assumed to be a point of origin (0, 0), the lateral direction is an i-coordinate axis and the vertical direction is a j-coordinate axis. Accordingly, a block (dot) with a parallax of dp in the distance image 126 can be expressed as (i, j, dp) using the pixel position i, j and the parallax dp.

The three-dimensional coordinate system in the real space according to the present embodiment is brought into a relative coordinate system with the vehicle 1 at the center. In this case, the rightward direction with respect to the traveling direction of the vehicle 1 is the positive direction of an X-axis, the upward direction of the vehicle 1 is the positive direction of a Y-axis, the traveling direction (forward direction) of the vehicle 1 is the positive direction of a Z-axis, and an intersection of a vertical line passing through the center of the two image capturing devices 110 and the road surface is a point of origin (0, 0, 0). In this case, if the road is assumed to have a flat surface, the road surface is coincident with an X-Z plane (Y=0). The position information obtaining unit 160 transforms the coordinates of the block (i, j, dp) in the distance image 126 to coordinates of a three-dimensional point (x, y, z) in the real space by the following equations 1 to 3.

$$x = CD/2 + z \cdot PW \cdot (i - IV) \quad \text{(Equation 1)}$$

$$y = CH + z \cdot PW \cdot (j - JV) \quad \text{(Equation 2)}$$

$$z = KS/dp \quad \text{(Equation 3)}$$

where CD is an interval (base length) between the image capturing devices 110, PW is a viewing angle per pixel, CH is a height at which the image capturing devices 110 are installed from the road surface, IV and JV are coordinates (pixels) of infinite points right in front of the vehicle 1, and KS is a distance coefficient (KS=CD/PW).

Subsequently, the position information obtaining unit 160 separates and extracts only a lane line 202 on a road 200 in the real space by using the converted position information, and modifies a parameter of a road model held in advance by the data holding unit 152 to conform to the actual road shape to recognize the road shape.

The road model is obtained by dividing a lane in which the subject vehicle is traveling on the road 200 (up to a detection end) into a plurality of zones at predetermined intervals, approximating left and right lane lines in each zone by three-dimensional linear equations and radially connecting the approximation results. The position information obtaining unit 160 determines parameters a and b of a linear equation in the horizontal direction and parameters c and d of a linear equation in the vertical direction of the coordinate system in the real space by using the road model, and obtains a linear equation in the horizontal direction as expressed by the following equation 4 and a linear equation in the vertical direction as expressed by the following equation 5.

$$x = a \cdot z + b \quad \text{(Equation 4)}$$

$$y = c \cdot z + d \quad \text{(Equation 5)}$$

The first representative distance deriving unit 162 firstly divides the detected region 122 into a plurality of first divided regions with respect to the horizontal direction. Subsequently, the first representative distance deriving unit 162 integrates relative distances within predetermined distances into which each of the first divided regions are sectioned for blocks above the road surface to generate a histogram. The first representative distance deriving unit 162 then derives a first representative distance corresponding to a peak in the distance distribution resulting from the integration. The distance corresponding to a peak refers to a peak value or a value near the peak value satisfying a given condition.

Figure 5A:
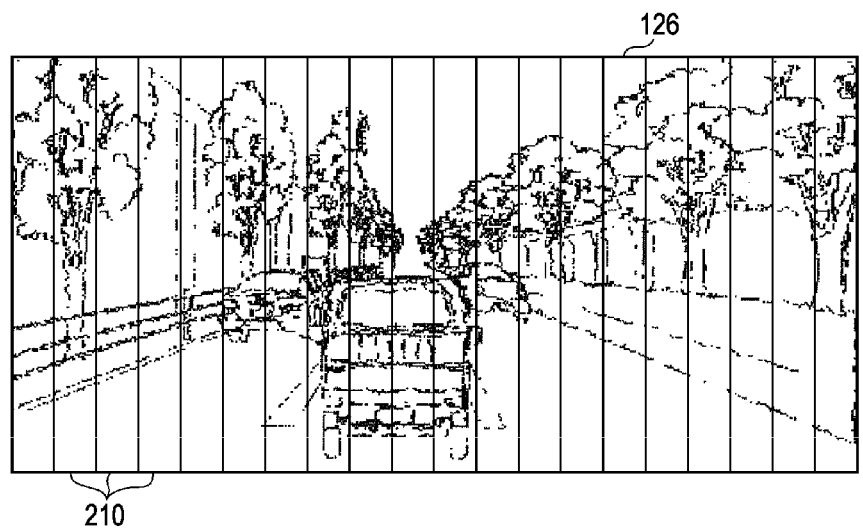
FIGS. 5A and 5B are explanatory views for explaining a first divided region and a first representative region.
Figure 5B:
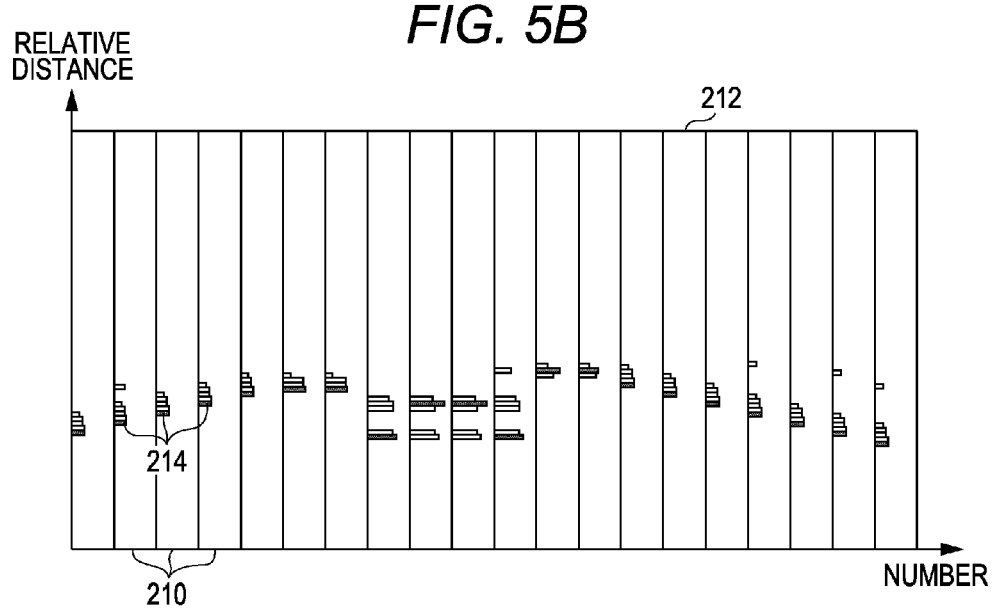

FIGS. 5A and 5B are explanatory views for explaining first divided regions 210 and first representative distances 214.

The first divided regions 210 have a strip shape as shown in FIG. 5A as a result of dividing the distance image 126 as shown in FIG. 4 horizontally into a plurality of regions. Such a first divided region 210 having a strip shape typically includes an array of 150 horizontal four pixels, for example. Herein, the detected region 122 is divided equally into twenty regions for convenience of description.

Subsequently, the first representative distance deriving unit 162 refers to a relative distance for each block and generates a histogram (shown by horizontally long rectangles (bars) in FIG. 5B) in each of the first divided regions 210. As a result, distance distribution 212 as shown in FIG. 5B is obtained. The vertical direction shows the relative distances to the vehicle 1 and the lateral direction shows the number of relative distances included in the sectioned predetermined distances. Note that FIG. 5B shows a virtual screen for calculation, and that a visual screen is not actually generated. The first representative distance deriving unit 162 then refers to the distance distribution 212 thus derived and specifies a first representative distance 214 (shown by a black rectangular in FIG. 5B) that is a relative distance corresponding to a peak.

The first divided region group generating unit 164 sequentially compares the first representative distances 214 of adjacent first divided regions 210, and groups first divided regions 210 having close first representative distances 214 (for example, within one meter) to generate one or more first divided region groups. In this case, if three or more first divided regions 210 have close first representative distances 214, all of such continuous first divided regions 210 are grouped as a first divided region group.

Figure 6:
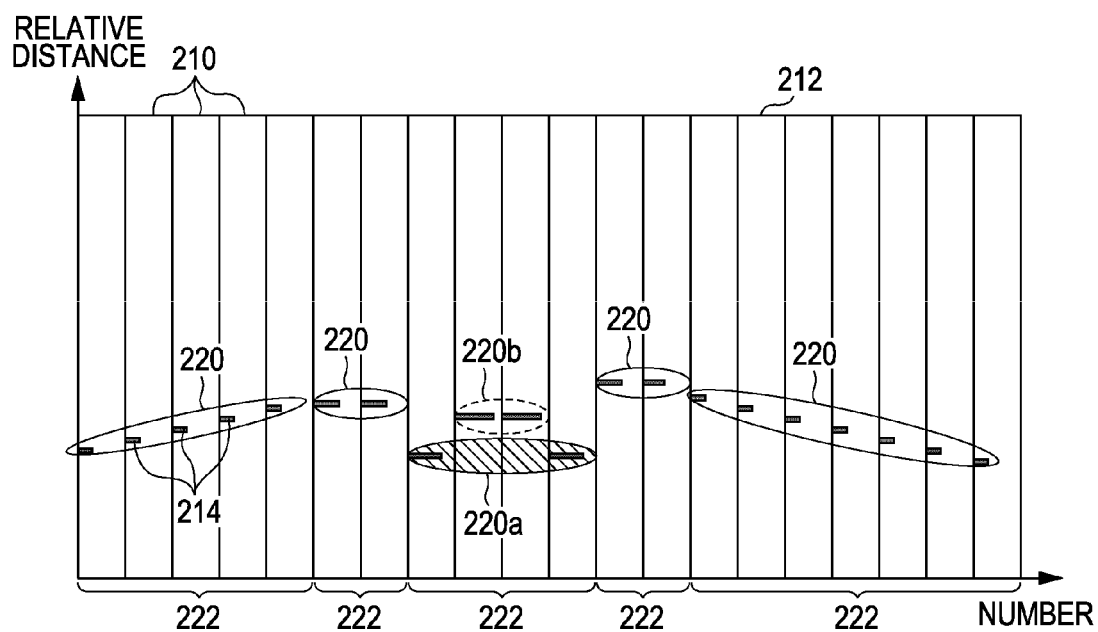
FIG. 6 is an explanatory view for explaining a first divided region group.

FIG. 6 is an explanatory view for explaining first divided region groups 222. The first divided region group generating unit 164 compares the first divided regions 210 and groups the first representative distances 214 as shown in FIG. 6 (virtual groups as a result of grouping are denoted by a reference numeral 220). As a result of the grouping, the first divided region group generating unit 164 can identify a three-dimensional object above the road surface. The first divided region group generating unit 164 can also recognize which of a rear part or a side part of a preceding vehicle, a structure along the road such as a guardrail and the like the three-dimensional object is, based on the transition of the relative distances in the horizontal direction and the vertical direction within the grouped three-dimensional object.

For example, the relative distance of the truck positioned at the center of the captured image 124 in FIG. 2A is also identified as an integrated three-dimensional object as a hatched group 220a in FIG. 6 through the grouping process as described above. However, different relative distances may be detected in the strip-shaped first divided region 210 such as those of a cabin part and a rear side of a cargo bed of the truck or the like.

In this case, there is no problem if the rear side of the cargo bed having the shortest relative distance is determined as the relative distance of the truck. However, if the area covered by the cabin part is large or when the total number of blocks for which the parallax is detected is large, the peak of the distance distribution in a given first divided region 210 may be determined as the relative distance of the cabin part, or grouping may be made for the cabin part and a group 220b shown by a broken line may be formed. In this case, a further different relative distance may be recognized if the cargo bed of the truck is loaded.

In the present embodiment, the first divided region group generating unit 164 associates the first divided regions 210 including the grouped first representative distances with one another to form the first divided region group 222 and passes the same to a process described below.

The second divided region group generating unit 166 divides the first divided region group 222 with respect to the vertical direction into a plurality of second divided regions, and groups second divided regions having relative distances therein close to the first representative distance 214 to generate a second divided region group.

Figure 7A:
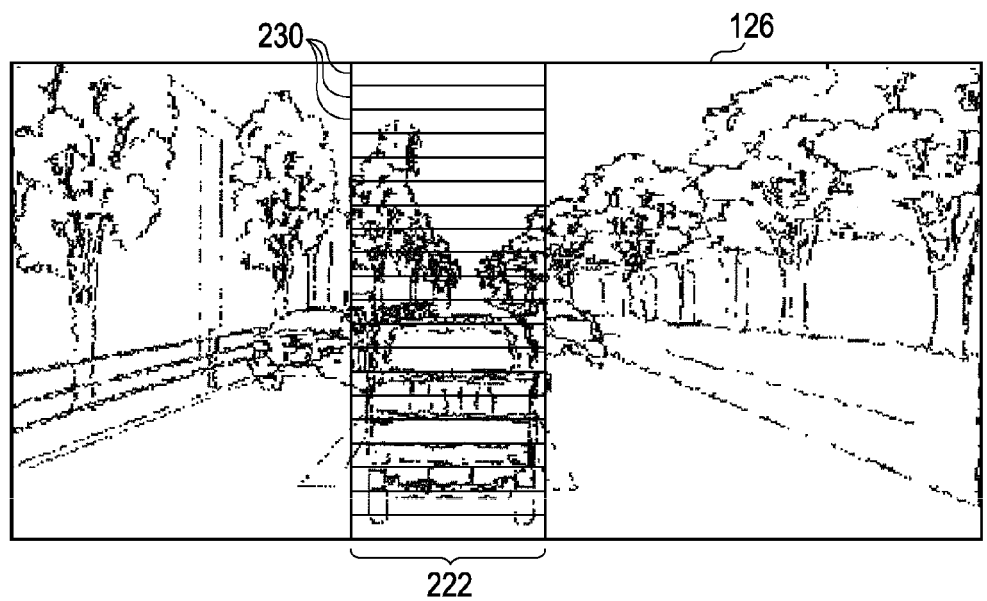
FIGS. 7A and 7B are explanatory views for explaining a second divided region and a second divided region group.
Figure 7B:
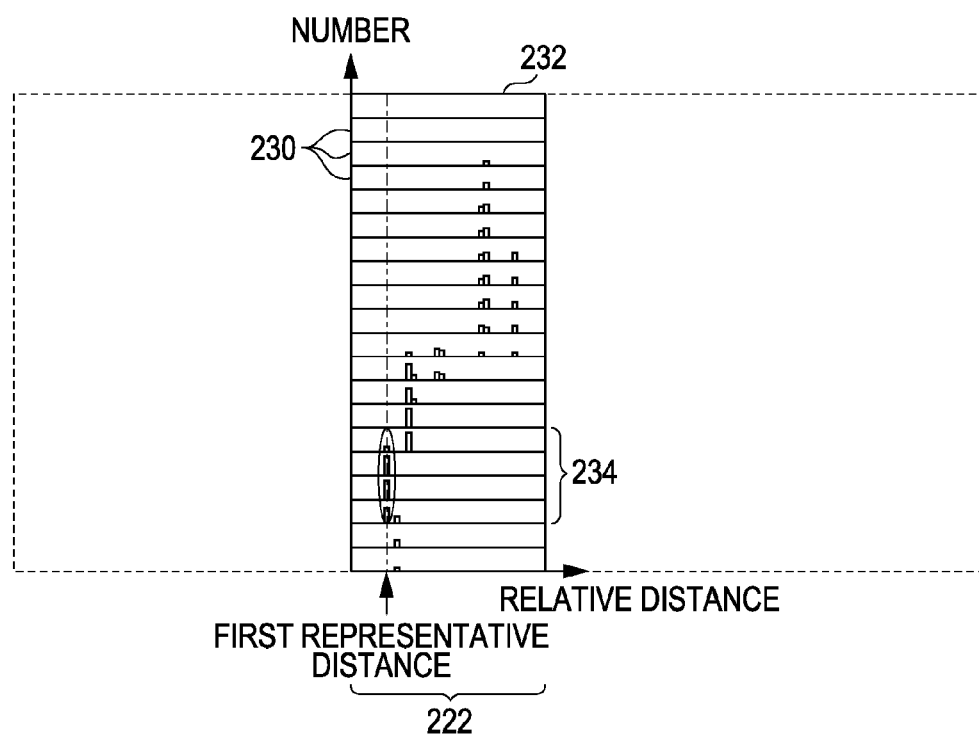

FIGS. 7A and 7B are explanatory views for explaining the second divided regions 230 and the second divided region group 234. The distance image 126 shown in FIG. 2B is used here again. The second divided region group generating unit 166 divides each of the first divided region groups 222 generated by the first divided region group generating unit 164 into a plurality of second divided regions 230 with respect to the vertical direction. However, the description will be made herein focusing on a first divided region group 222 in which the truck positioned at the center of the detected region 122 is included for easier understanding.

The plurality of second divided regions 230 resulting from dividing the first divided region group 222 in the vertical direction have a strip shape extending in the horizontal direction as shown in FIG. 7A. Such a second divided region 230 having a strip shape typically includes an array of 50 vertical four pixels, for example. Herein, the detected region 122 is divided equally into twenty regions for convenience of description.

Subsequently, the second divided region group generating unit 166 refers to a relative distance for each block and generates a histogram (shown by vertically long rectangles in FIG. 7B) in each of the second divided regions 230. As a result, distance distribution 232 as shown in FIG. 7B can be obtained. The lateral direction shows the relative distances to the vehicle 1 and the vertical direction shows the number of relative distances included in the sectioned predetermined distances. Note that FIG. 7B shows a virtual screen for calculation, and a visual screen is not actually generated.

The second divided region group generating unit 166 extracts, based on the first representative distance 214 (shown by an alternate long and short dash line in FIG. 7B), all second divided regions 230 having such relative distances that the differences between the first representative distance 214 and the relative distances are equal to smaller than a predetermined distance, and groups the extracted second divided regions 230 as a second divided region group 234. The first representative distance 214 described above is the first representative distance 214 based on which the first divided region group 222 is obtained by the first divided region group generating unit 164 through grouping.

Figure 8A:
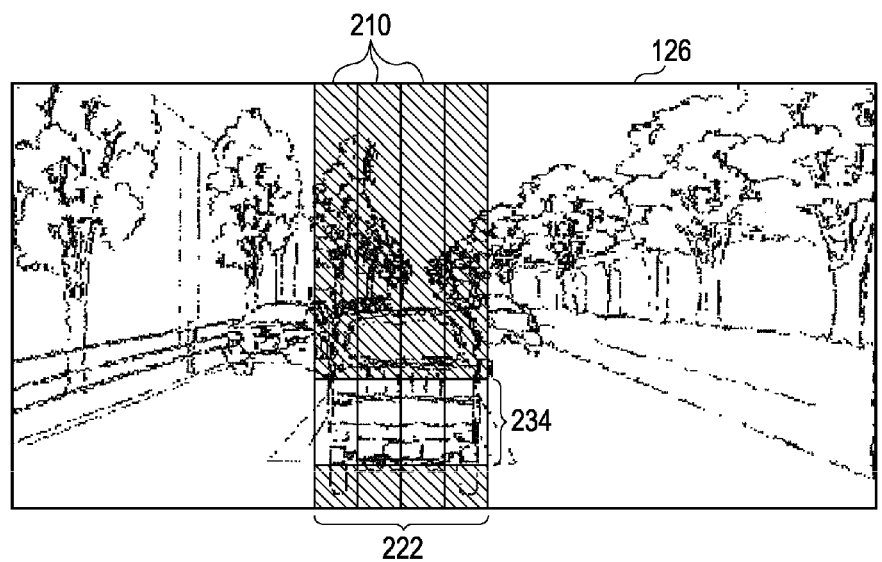
FIGS. 8A and 8B are explanatory views for explaining an operation of a first representative distance deriving unit after generating the second divided region group.
Figure 8B:
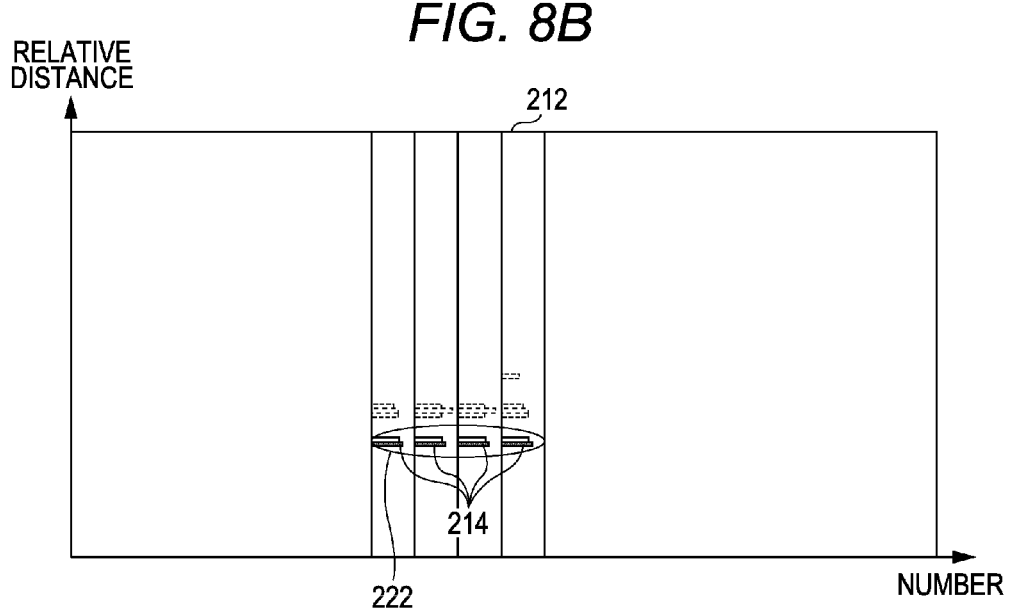

FIGS. 8A and 8B are explanatory views for explaining an operation of the first representative distance deriving unit 162 after the second divided region group 234 is generated. The first representative distance driving unit 162 divides the distance image 126 in the horizontal direction into a plurality of regions as described with reference to FIGS. 5A and 5B to obtain the strip-shaped first divided regions 210 as shown in FIG. 5A. The description will be made herein focusing on the first divided region group 222 in which the truck positioned at the center of the detected region 122 is included as shown in FIG. 8A for easier understanding.

The first representative distance deriving unit 162 refers to a relative distance for each block and generates a histogram in each of the first divided regions 210. In the present embodiment, after the second divided region group 234 is generated by the second divided region group generating unit 166, a target range for deriving the first representative distance in the first divided region group 222 in which the second divided region group 234 is generated is limited to a vertical range corresponding to the specified second divided region group 234.

Accordingly, the first representative distance deriving unit 162 assumes only the vertical range in the first divided region group 222 as the target range and obtains distance distribution 212 as shown in FIG. 8B. Since the target range is limited to the vertical range corresponding to the second divided region group 234 to generate the distance distribution 212, the relative distances corresponding to parts other than the rear side of the cargo bed, such as the cabin part, that appear in FIG. 5B do not appear in this case (shown by a broken line in FIG. 8B). As described above, the first representative distance deriving unit 162 can extract only the relative distance corresponding to the rear side of the cargo bed.

The first representative distance deriving unit 162 then refers to the distance distribution 212 thus derived in a state where the target range is limited to the vertical range, and specifies a first representative distance 214 (shown by a black rectangular in FIG. 8B) that is a relative distance corresponding to a peak. Accordingly, the first representative distance deriving unit 162 can reliably recognize only the relative distance of the rear end of the preceding vehicle to be monitored, that is, the rear side of the cargo bed of the truck as the first representative distance in subsequent processes. In addition, the first divided region group generating unit 164 can group the relative distances and appropriately generate the first divided region group 222.

Although the first divided region group 222 in which the truck positioned at the center of the detected region 122 is included is focused on in the description above, it is needless to say that a first divided region group 222 in which another three-dimensional object is recognized can be processed similarly. In this case, the first representative distance deriving unit 162 limits a target range of each first divided region group 222 in which a second divided region group 234 is generated independently to a vertical range thereof and derives a first representative distance 214 therefrom. Specifically, a vertical range is provided independently for each first divided region group 222 and a first representative distance 214 is obtained individually from each vertical range.

(Vehicle Exterior Monitoring Method)

Figure 9:
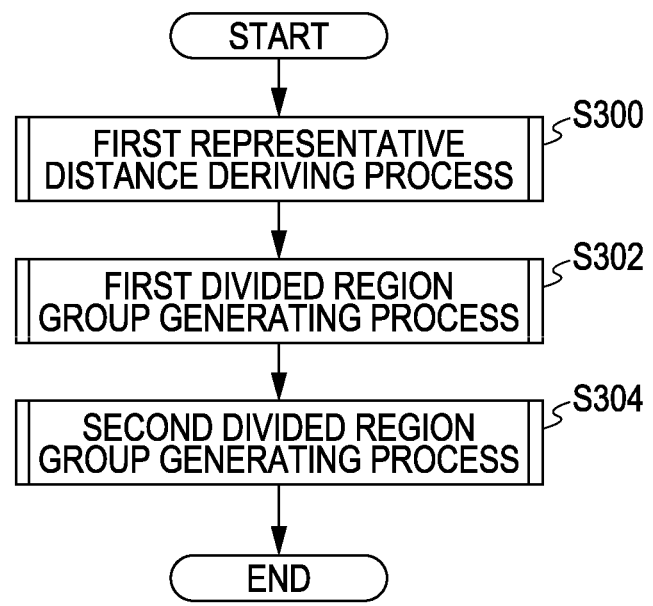
FIG. 9 is a flowchart showing an overall flow of a vehicle exterior monitoring method.
Figure 11:
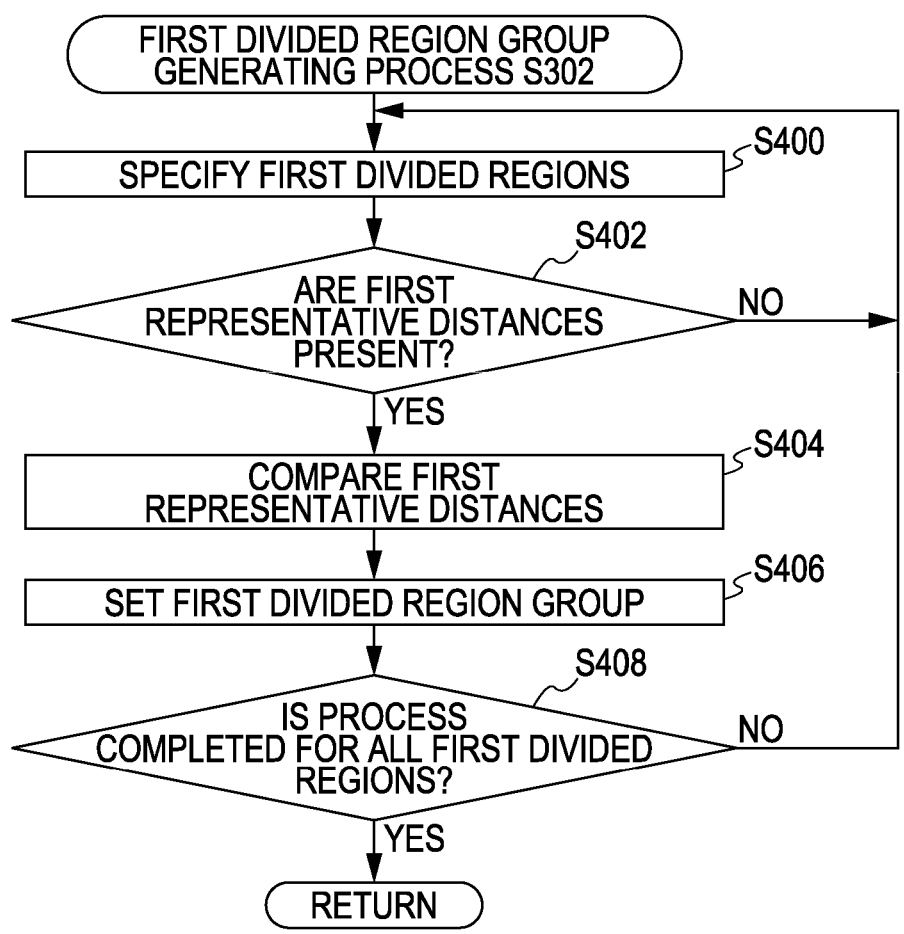
FIG. 11 is a flowchart showing a flow of a first divided region group generating process.
Figure 12:
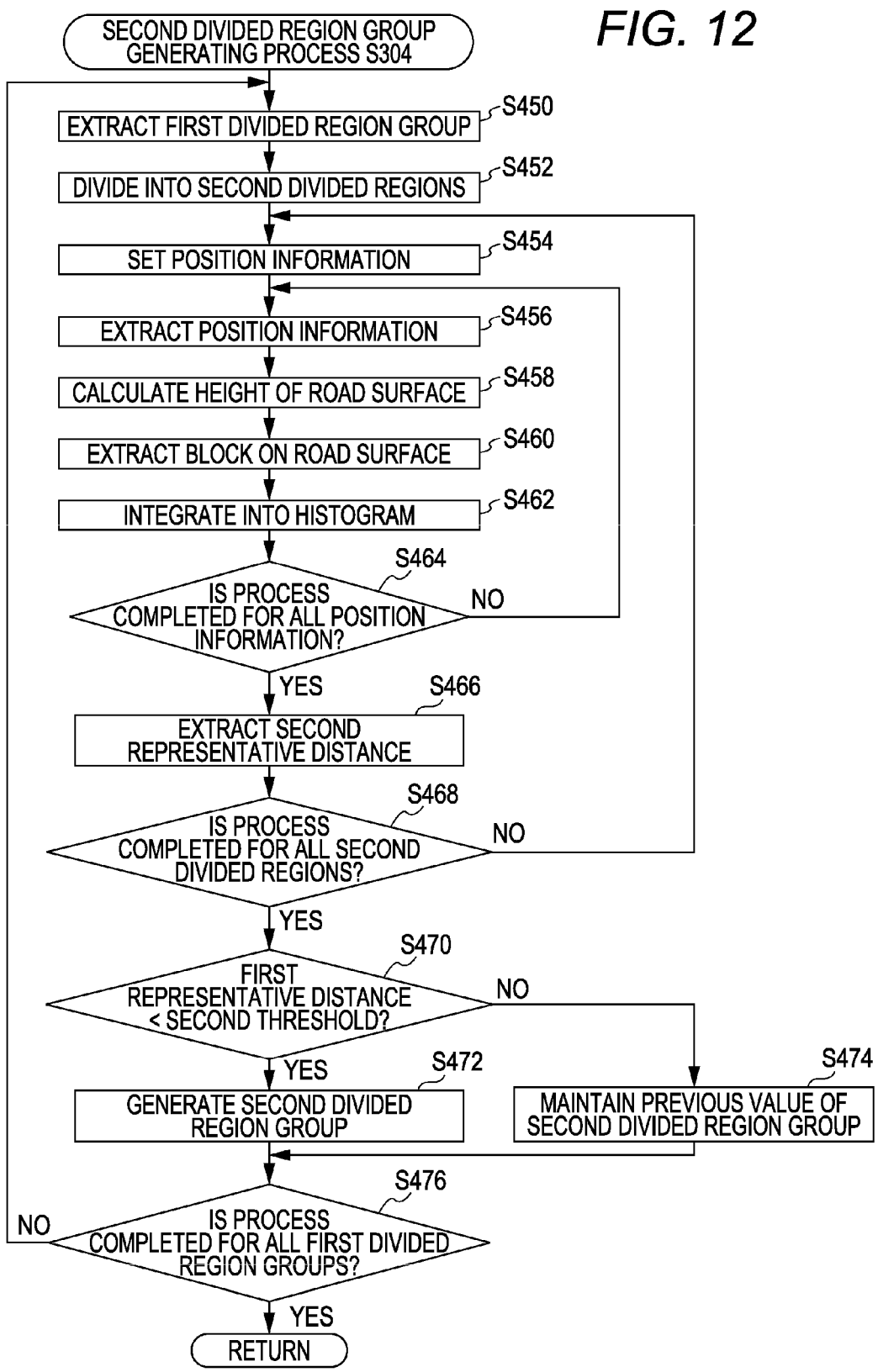
FIG. 12 is a flowchart showing a flow of a second divided region group generating process.

Specific processes of the vehicle exterior monitoring device 130 will be described below based on flowcharts of FIGS. 9 to 12. FIG. 9 shows an overall flow relating to an interrupt process when parallax information is sent from the image processing device 120, and FIGS. 10 to 12 show individual sub-routines in the interrupt process.

As shown in FIG. 9, when an interrupt according to the vehicle exterior monitoring method is triggered by receiving a distance image 126, a first representative distance 214 is derived for each first divided region 210 based on parallax information for each block in a detected region 122 derived by the image processing device 120 (S300). Next, a first divided region group 222 resulting from grouping horizontally in units of a three-dimensional object is generated (S302). Then, relative distances for second divided regions 230 in the vertical direction within the first divided region group 222 are further determined, and a second divided region group 234 is generated (S304). The second divided region group 234 thus generated is used as a vertical range for limiting a target range for deriving a first representative distance 214 in the generation of a next first divided region group 222.

(First Representative Distance Deriving Process S300)

Figure 10:
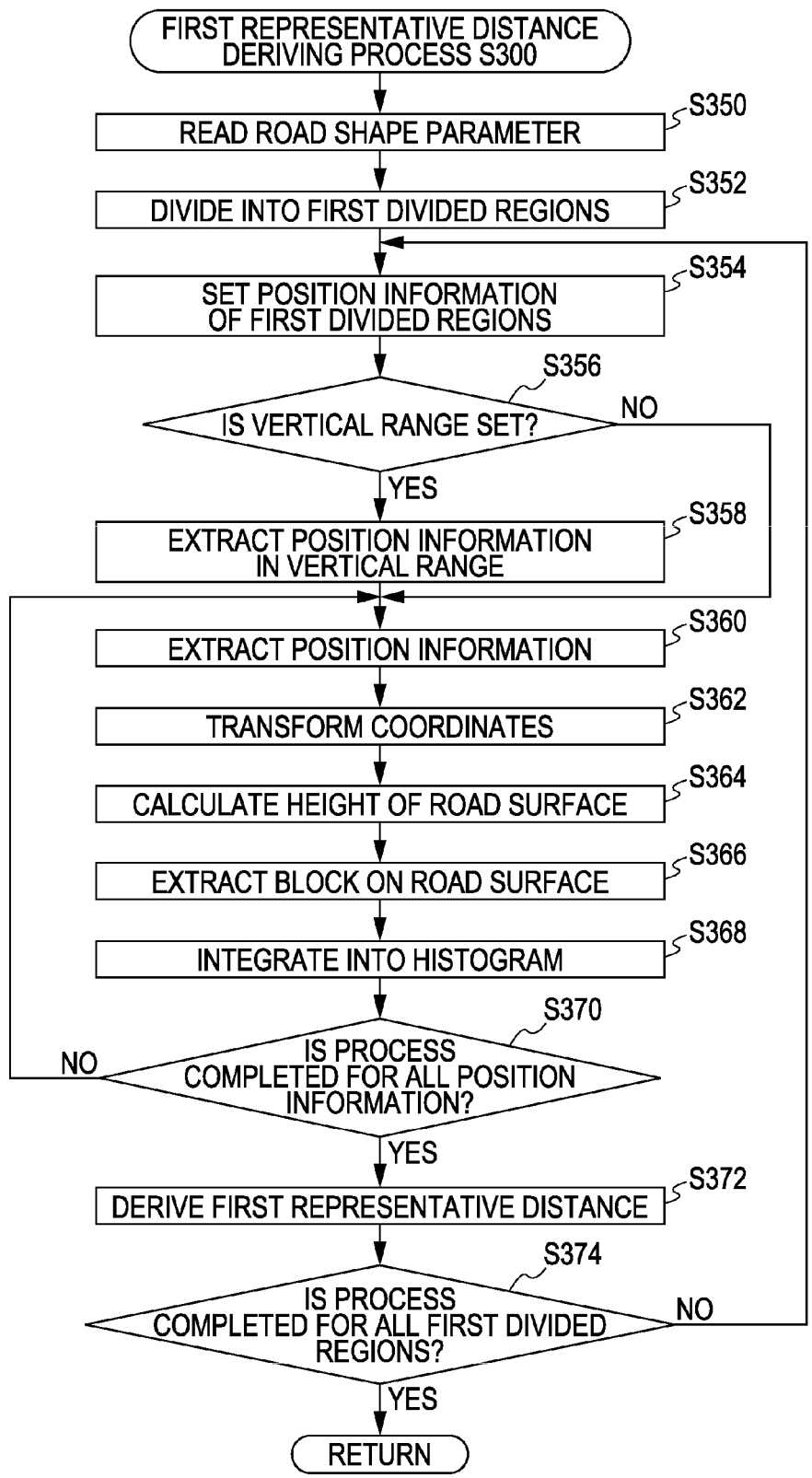
FIG. 10 is a flowchart showing a flow of a first representative distance deriving process.

Referring to FIG. 10, the position information obtaining unit 160 reads a road shape parameter (S350), and divides the detected region 122 into 150 first divided regions 210 in units of four pixels with respect to the horizontal direction, for example (S352). Next, the position information obtaining unit 160 extracts one first divided region 210 from the 150 first divided regions 210 obtained by the division sequentially from the left in the horizontal direction, for example, and sets all position information present in the extracted first divided region 210 (S354).

Then, it is determined whether a vertical range is set in a previous interrupt process (S356). If a vertical range is not set (NO in S356), the process proceeds to the next position information extracting process S360. On the other hand, if a vertical range is set (YES in S356), the position information obtaining unit 160 extracts only position information present in the set vertical range from the position information in the first divided region 210, and updates the position information set in the position information setting process S354 therewith (S358).

The position information obtaining unit 160 sequentially extracts one position information from a plurality of set position information (S360), and transforms coordinates of a block (i, j, dp) in the distance image 126 to coordinates of a point (x, y, z) in the real space by using the equations 1 to 3 (S362). Then, the position information obtaining unit 160 calculates a height yr of the road surface at the coordinate z of the point in the real space (S364) by using the equations 4 and 5, and regards a block, where the coordinate y of the point in the real space is higher than the height yr of the road surface, as a relative distance z effective as a three-dimensional object (S366). The first representative distance deriving unit 162 integrates (votes) the relative distance into a histogram sectioned at a predetermined distance interval (S368). Even if the coordinate y of the point in the real space is higher than the height yr of the road surface, a block with a height of 0.1 m or lower from the road surface is regarded as a lane line, dirt, a shadow or the like and excluded from subjects to be processed. In addition, a block that is above the height of the subject vehicle 1 is regarded as a pedestrian overpass, a road sign or the like, and also excluded from subjects to be processed.

The position information obtaining unit 160 determines whether or not integration to the histogram is performed for all of the plurality of set position information (S370). If the integration is not completed for all of the position information (NO in S370), the position information extracting process S360 and subsequent processes are repeated from position information that is not subjected to integration to the histogram.

The first representative distance deriving unit 162 refers to the thus generated histogram, and determines that a three-dimensional object is present in the first divided region 210 if there is a zone where the frequency of the histogram (the number of relative distances) is equal to or larger than a predetermined threshold (set as appropriate). The first representative distance deriving unit 162 then defines a relative distance corresponding to a zone where the frequency of the histogram is equal to or larger than the predetermined threshold and the largest as a first representative distance 214 (S372). Although the maximum value of the histogram is simply defined as the first representative distance 214 herein, the predetermined threshold may be set to vary depending on the relative distance so that a block with a shorter relative distance is preferentially extracted as the first representative distance 214.

The first representative distance deriving unit 162 then determines whether derivation of the first representative distance 214 is performed for all of the plurality of first divided regions 210 (S374). If it is not determined that derivation of the first representative distance 214 is completed for all of the first divided regions 210 (NO in S374), the position information setting process S354 and subsequent processes are repeated for a new first divided region. On the other hand, if derivation of the first representative distance 214 is completed for all of the first divided regions 210 (YES in S374), the first representative distance deriving process S300 is terminated.

Note that the position information received from the image processing device 120 may include erroneously detected position information, but such position information does not results in a large frequency in the histogram. It is determined herein that a three-dimensional object is present only when the frequency is equal to or larger than the predetermined threshold, and the effect of erroneously detected position information can be minimized.

(First Divided Region Group Generating Process S302)

Referring to FIG. 11, the first divided region group generating unit 164 specifies any first divided region 210 from a plurality of first divided regions 210 sequentially from the left in the horizontal direction, for example, and also specifies a first divided region 210 adjacent to the any first divided region 210 on the right thereof in the horizontal direction (S400). The first divided region group generating unit 164 then determines whether or not a first representative distance 214 is present in each of the specified first divided regions 210 (S402). If no first representative distance 214 is present in both the first divided regions 210 (NO in S402), the first divided region specifying process S400 and subsequent processes are repeated for next first divided regions 210. On the other hand, if a first representative distance 214 is present in each of the first divided regions 210 (YES in S402), the first representative distances 214 of both the first divided regions 210 are compared (S404).

If the difference between the first representative distances 214 is equal to or smaller than a predetermined threshold (a value at which the distances are deemed to be the same three-dimensional object), the first representative distances 214 are regarded to be close, and the first divided region group generating unit 164 groups the first divided regions 210. The first divided region group generating unit 164 then sends information on the grouping to the vehicle exterior controlling device 140 and sets the first divided regions 210 having the grouped first representative distances 214 as a first divided region group 222 (S406). In this process, if one of the first divided regions 210 is already set in a first divided region group 222, the other first divided region 210 is integrated in the first divided region group 222.

In the grouping, a positional relationship of a plurality of groups is further determined. For example, when positions of end points are close to each other and transitions of relative distances in the horizontal direction and the vertical direction in three-dimensional objects are substantially equal (continuous) among groups of three-dimensional objects of the same type, the groups are determined to represent a same surface of a same three-dimensional object and are integrated into one group. In this process, the transitions of the relative distances in the horizontal direction and the vertical direction in three-dimensional objects can be defined by approximation straight lines obtained by the Hough transform or the least squares method. In the case of a preceding vehicle, a plurality of groups can be integrated into one group also based on the fact that the relative moving speeds with respect to the z coordinates are equal.

Then, the first divided region group generating unit 164 determines whether the generation of the first divided region group 222 is performed for all of the plurality of first divided regions 210 (S408). If the generation of the first divided region group 222 is not completed for all of the first divided regions 210 (NO in S408), the specifying process S400 and subsequent processes are repeated for new first divided regions 210. On the other hand, if the generation of the first divided region group 222 is completed for all of the first divided regions 210 (YES in S408), the first divided region group generating process S302 is terminated.

(Second Divided Region Group Generating Process S304)

Referring to FIG. 12, the second divided region group generating unit 166 extracts one first divided region group 222 from a plurality of set first divided region groups 222 sequentially from the left in the horizontal direction, for example (S450). Next, the second divided region group generating unit 166 divides the extracted first divided region group 222 into 50 second divided regions 230 in units of vertical four pixels, for example, with respect to the vertical direction (S452). The second divided region group generating unit 166 extracts one second divided region 230 from the 50 second divided regions 230 obtained by the division sequentially from the bottom in the vertical direction, for example, and sets all position information present in the extracted second divided region 230 (S454). Note that if a vertical range is set in the vertical range determining process S356 described above, the second divided region group generating unit 166 performs division into the second divided regions 230 only for the vertical range.

The second divided region group generating unit 166 sequentially extracts one position information from a plurality of set position information (S456), and calculates the height yr of the road surface at the coordinate z of the point in the real space for each block by using the equations 4 and 5 (S458). The second divided region group generating unit 166 regards a block, where the coordinate y of the point in the real space is higher than the height yr of the road surface, as a relative distance z effective as a three-dimensional object (S460), and integrates (votes) the relative distance into a histogram sectioned at a predetermined distance interval (S462). Even if the coordinate y of the point in the real space is higher than the height yr of the road surface, a block with a height of 0.1 m or lower from the road surface is regarded as a lane line, dirt, a shadow or the like and excluded from subjects to be processed similarly to the histogram described with reference to FIG. 10. In addition, a block that is above the height of the subject vehicle 1 is regarded as a pedestrian overpass, a road sign or the like, and also excluded from subjects to be processed.

The second divided region group generating unit 166 determines whether integration to the histogram is performed for all of the plurality of set position information (S464). If the integration is not completed for all of the position information (NO in S464), the extracting process S456 and subsequent processes are repeated for position information for which integration into a histogram is not completed. On the other hand, if the integration is completed for all of the position information (YES in S464), the second divided region group generating unit 166 refers to the generated histogram and derives a difference from the first representative distance 214 based on which the first divided region group 222 is obtained by the first divided region group generating unit 164 through grouping. The second divided region generating unit 166 specifies a relative distance group with the difference being equal to or smaller than a predetermined threshold (a value at which the distances are deemed to be the same part of the same three-dimensional object). The second divided region group generating unit 166 then determines whether a predetermined proportion (50%, for example) of the relative distance group (corresponding to the area of the histogram) near the first representative distance 214 with respect to the total number of relative distances in the second divided regions 230 is included. If the predetermined proportion of the relative distance group is included, the second divided region group generating unit 166 extracts a second representative distance corresponding to a peak in the relative distance group as a grouping candidate (S466). Since only a relative distance group of a predetermined proportion or larger is determined as a grouping candidate, it is possible to reliably extract a three-dimensional object that has equal distance as the first representative distance.

The second divided region group generating unit 166 then determines whether the second representative distance extraction is performed for all of the plurality of set second divided regions 230 (S468). If the extraction is not completed for all of the second divided regions 230 (NO in S468), the position information setting process S454 and subsequent processes are repeated. On the other hand, if the extraction is completed for all of the second divided regions 230 (YES in S468), it is determined whether or not the first representative distance 214 based on which the first divided region group 222 is obtained by grouping is smaller than a predetermined second threshold (S470). If the first representative distance is smaller than the second threshold (YES in S470), the process proceeds to a second divided region group generating process S472.

The second divided region generating unit 166 groups the second divided regions 230 for which the second representative distances are extracted in the second representative distance extracting process S466 to generate a second divided region group 234 (S472). The second divided region group 234 is a vertical range for limiting the target range from which the first representative distance 214 is derived. There may be a case in which second divided regions 230 for which second representative distances are not extracted are included for a predetermined threshold (a value at which the regions can be determined not to be of the same part of the same three-dimensional object) or more between the second divided regions 230 for which the second representative distances are extracted. In this case, the second divided region group generating unit 166 groups only the second divided regions 230 for which the second representative distances are extracted and which are located vertically below the second divided regions 230 for which second representative distances are not extracted. Accordingly, a second divided region group 234 can be generated only for a three-dimensional object that is expected to be extracted.

In the present embodiment, the second divided region group generating unit 166 resets the generated vertical range to a range that is wider by a predetermined area upward and downward in the vertical direction. In the case of a three-dimensional object such as a preceding vehicle, the vertical range becomes closer to the center (infinite point) of the detected region 122 and becomes smaller according to the relative distance to the subject vehicle 1. Specifically, for example, if the target to be monitored is a preceding vehicle on the same lane as the subject vehicle, this occurs as the relative distance to the subject vehicle 1 is longer. Note that if the next position of the three-dimensional object is strictly limited based on the current position thereof, there is a possibility that the change in the position within the detected region 122 of the three-dimensional object cannot be reflected. Accordingly, the vertical range is reset to a range extended in the vertical direction, and as a result, even when the detected range of the three-dimensional object has changed because of a change in the positional relation with the subject vehicle 1, the changed part can be appropriately extracted. A vertical range can also be extended leftward and rightward in the horizontal direction.

Alternatively, in the present embodiment, the second divided region group generating unit 166 may reset the generated vertical range to a range that is extended to the lower end of the first divided region group 222 downward in the vertical direction. Accordingly, the vertical range extends from the upper end of the second divided region group 234 to the lower end of the first divided region group 222. As described above, in the case of a three-dimensional object such as a preceding vehicle, the vertical range becomes closer to the center (infinite point) of the detected region 122 and becomes smaller according to the relative distance to the subject vehicle 1. Specifically, for example, if the target to be monitored is a preceding vehicle on the same lane as the subject vehicle, this occurs as the relative distance to the subject vehicle 1 is longer. In other words, a three-dimensional object located above the preceding vehicle currently recognized has a longer relative distance to the subject vehicle than the preceding vehicle, and a three-dimensional object located below the preceding vehicle has a shorter relative distance than the preceding vehicle. In the present embodiment, since a three-dimensional object having a short relative distance is to be extracted, it is desirable to extract a three-dimensional object having shorter relative distance than a preceding vehicle immediately in front, such as a vehicle cutting into between the subject vehicle 1 and the preceding vehicle, as well as to extract the preceding vehicle immediately in front. Accordingly, the vertical range is reset to a range extended to the lower end of the first divided region group 222, and as a result, even when a three-dimensional object appears nearer than a monitoring target, the three-dimensional object can be appropriately extracted.

Furthermore, the second divided region group generating unit 166 stores the representative distance 214 based on which the first divided region group 222 is obtained by the first divided region group generating unit 164 through grouping. Then, if the first representative distance currently derived differs from the first representative distance 214 derived previously by a predetermined threshold (a value at which the same three-dimensional object can move between frames) or larger, the setting of the vertical range is cancelled. This is because the difference of the predetermined threshold or larger indicates that a new three-dimensional object has entered between the previously detected three-dimensional object and the subject vehicle 1 or that the previously detected three-dimensional object cannot be detected any more. Accordingly, the first representative distance deriving unit 162 performs the process of deriving the first representative distance 214 for the entire first divided region group 222 instead of limiting to the vertical range.

If the first representative distance is equal to or longer than the second threshold (NO in S470) the second divided region group generating unit 166 does not generate a new second divided region group 234 and maintains the previously generated second divided region group 234 as the current second divided region group 234 (does not update the second divided region group 234). This is because the detecting accuracy may be lowered for a three-dimensional object located at a far position due to the detection resolution and the luminance at which light can be received, and the object of the present embodiment can be achieved by using the previous value rather than using such a relative distance obtained with a lower accuracy.

The second divided region generating unit 166 determines whether the generation of the second divided region group is performed for all of the plurality of set first divided region groups 222 (S476). If the generation of the second divided region group is not completed for all of the first divided region groups (NO in S476), the extracting process S450 of the first divided region group 222 and subsequent processes are repeated. On the other hand, if the generation is completed for all of the first divided region groups 222 (YES in S476), the second divided region group generating process S304 is terminated.

As described above, according to the vehicle exterior monitoring device 130 according to the present embodiment, a three-dimensional object immediately in front of the subject vehicle 1 can be correctly recognized even when there is a plurality of relative distances that are peak candidates in the distance distribution, by deriving the first representative distance 214 only for the vertical range.

In addition, since the target range for which the first representative distance 214 is derived by the first representative distance deriving unit 162 is limited to the vertical range rather than for the entire first divided region group 222, the processing load can be reduced by the limitation. In addition, with the reduction in the processing load, the processing rate of the entire vehicle exterior monitoring system 100 can be increased, the responsivity of the entire system can be improved, and high security can be ensured.

Furthermore, since the first representative distance deriving unit 162 limits the target region to a vertical region independently in each first divided region group 222, it is possible to efficiently and appropriately recognize a three-dimensional object located immediately in front of the vehicle 1 while reducing the processing load.

In addition, the first representative distance deriving unit 162 can derive the first representative distance 214 again by limiting to a vertical range in the same frame, but may reflect the vertical range in deriving the first representative distance 214 for the next frame. Since frames are switched at 1/60 seconds, the calculation result will be little affected by the reflection of the vertical range to the next frame. Since the process of deriving the first representative distance is required only once during one frame, the responsivity of the entire system can further be improved.

Second Embodiment

In the first embodiment, the second divided region group 234 is derived by grouping the second divided regions 230 having relative distances close to the first representative distance 214 based on which the first divided region group 222 is obtained by the first divided region group generating unit 164 through grouping. According to such a configuration, the processing load can advantageously be reduced. However, if the first representative distance 214 is not a desired relative distance, that is, if the first representative distance 214 is not a relative distance of a three-dimensional object located immediately in front of the vehicle 1, it may take time corresponding to some frames until an appropriate first representative distance 214 is derived.

Accordingly, in the second embodiment, a technology will be described that is capable of appropriately deriving a relative distance of a three-dimensional object located immediately in front of the vehicle 1 as the first representative distance 214, although the processing load becomes a little heavier.

(Vehicle Exterior Monitoring Device 530)

Figure 13:
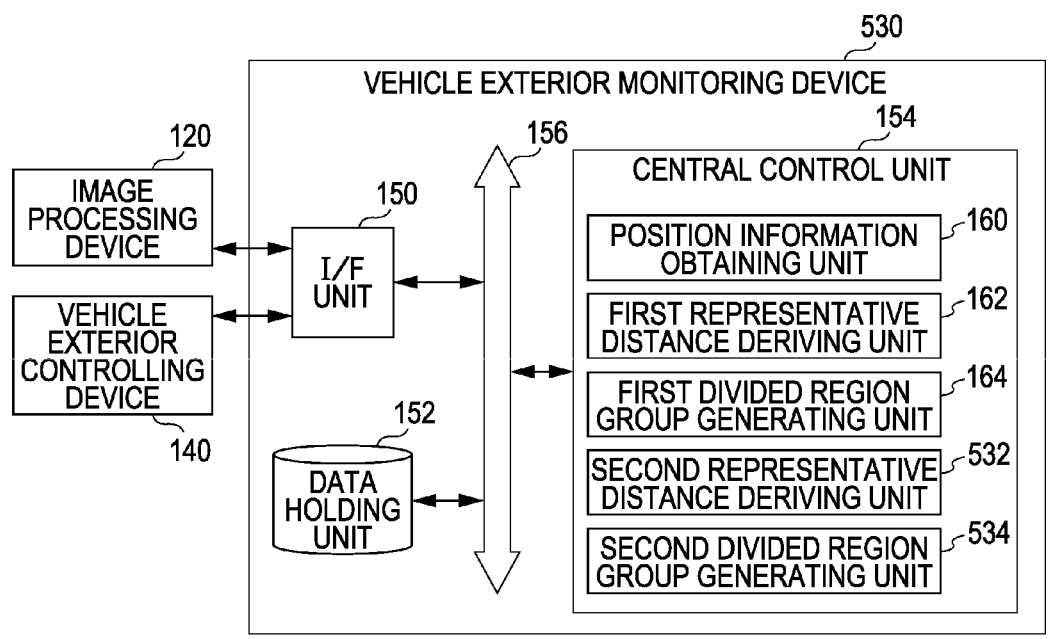
FIG. 13 is a functional block diagram showing general functions of a vehicle exterior monitoring device according to a second embodiment.

FIG. 13 is a functional block diagram showing general functions of a vehicle exterior monitoring device 530 according to the second embodiment. As shown in FIG. 13, the vehicle exterior monitoring device 530 includes an interface (I/F) unit 150, a data holding unit 152 and a central control unit 154. The central control unit 154 also functions as a position information obtaining unit 160, a first representative distance deriving unit 162, a first divided region group generating unit 164, a second representative distance deriving unit 532 and a second divided region group generating unit 534. Since the I/F 150, the data holding unit 152, the central control unit 154, the position information obtaining unit 160, the first representative distance deriving unit 162 and the first divided region group generating unit 164 have substantially the same functions as the components already described in the first embodiment, redundant description will be omitted. The second representative distance deriving unit 532 and the second divided region group generating unit 534 having different configurations will be mainly described here.

The second divided region group generating unit 532 divides the first divided region group 222 generated by the first divided region group generating unit 164 into a plurality of second divided regions 230, and derives a second representative distance corresponding to a peak in distance distribution of each second divided region 230 based on the position information.

The second divided region group generating unit 534 groups the second divided regions 230 based on the second representative distance derived by the second representative distance deriving unit 532 to generate a second divided region group 234 having such a relative distance that is the shortest and whose difference from the first representative distance 214 is equal to or smaller than the first threshold.

Figure 14A:
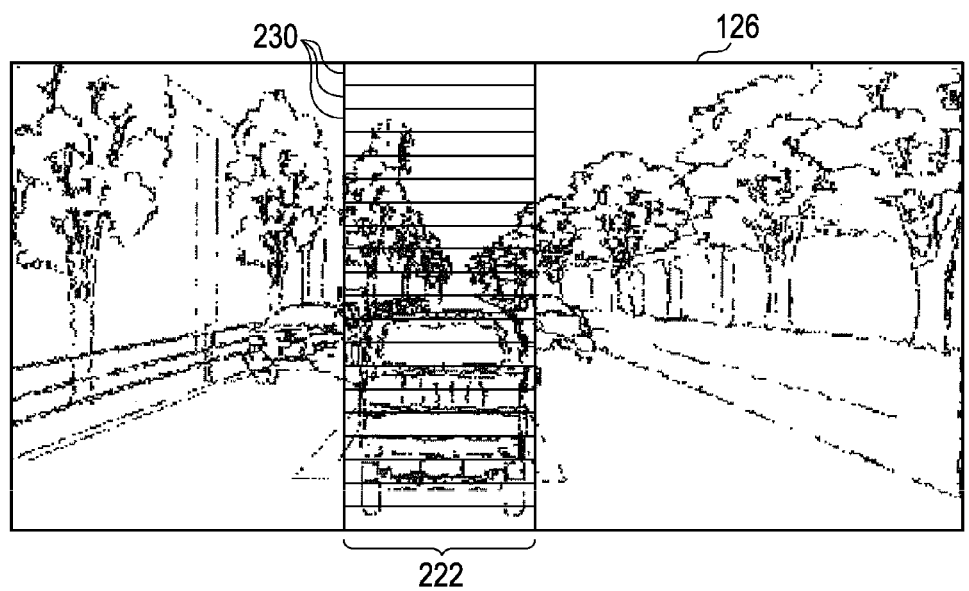
FIGS. 14A and 14B are explanatory views for explaining a second divided region and a second divided region group.
Figure 14B:
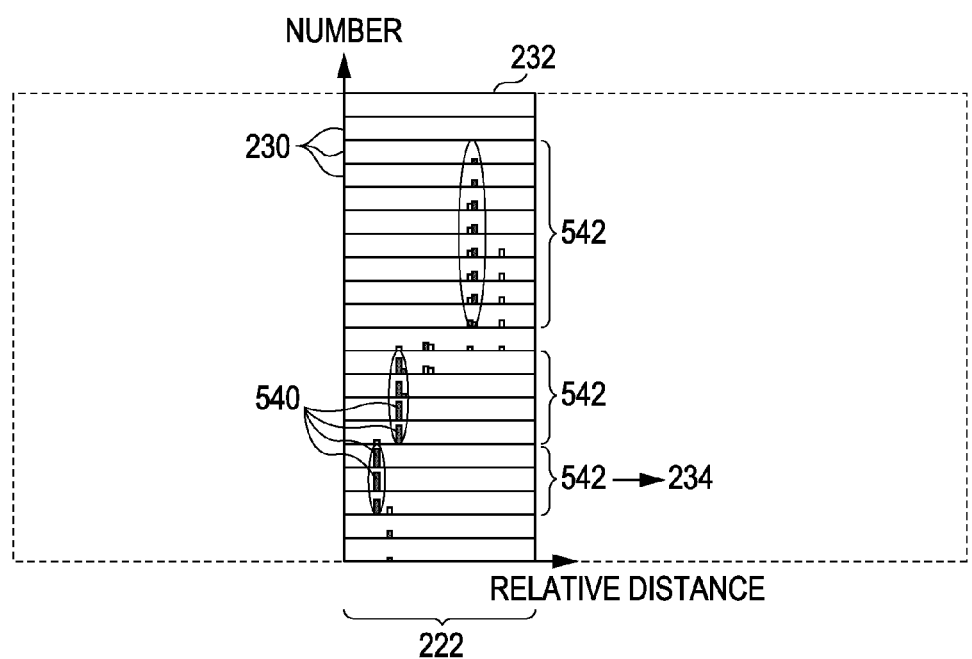

FIGS. 14A and 14B are explanatory views for explaining the second divided regions 230 and the second divided region group 234. The second divided region group generating unit 534 divides each of the first divided region group 222 generated by the first divided region group generating unit 164 into a plurality of second divided regions 230 with respect to the vertical direction. However, the description will also be made herein focusing on the first divided region 222 in which the truck positioned at the center of the detected region 122 is included for easier understanding.

The second divided region group generating unit 532 refers to a relative distance for each block and generates a histogram (shown by vertically long rectangles in FIG. 14B) in each of the second divided regions 230. As a result, distance distribution 232 as shown in FIG. 14B similarly to FIG. 7B can be obtained. The lateral direction shows the relative distances to the vehicle 1 and the vertical direction shows the number of relative distances included in the sectioned predetermined distances. The second representative distance deriving unit 532 then refers to the distance distribution 232 thus derived and specifies a second representative distance 540 (shown by a black rectangular in FIG. 14B) that is a relative distance corresponding to a peak.

The second divided region group generating unit 534 sequentially compares the second representative distances 540 of adjacent second divided regions 230, and groups second divided regions 230 having close second representative distances 540 (for example, within one meter) to generate one or more second divided region group candidates 542. In this case, if three or more second divided regions 230 have close second representative distances 540, all of such continuous second divided regions 230 are grouped as a second divided region group candidate 542. Subsequently, the second divided region group generating unit 534 extracts a second divided region group candidate 542 having a relative distance that is the shortest and whose difference from the first representative distance 214 is equal to or smaller than the first threshold from the second divided region group candidates

542 as a second divided region group 234. The first threshold is a value at which the three-dimensional object can be determined to be identical to the three-dimensional object having the first representative distance 214.

Specific processes of the vehicle exterior monitoring device 530 will be described below. However, since the overall flow (FIG. 9), the first representative distance deriving process S300 (FIG. 10), and the first divided region group generating process S302 (FIG. 11) of the vehicle exterior monitoring method are substantially the same, detailed description thereof will not be repeated. Note that the second divided region group generating process S304 will be described with reference to a flowchart of FIG. 15, and processes that are substantially the same as those in FIG. 12 will be identified by the same numerals and description thereof will be omitted.

(Second Divided Region Group Generating Process S304)

Figure 15:
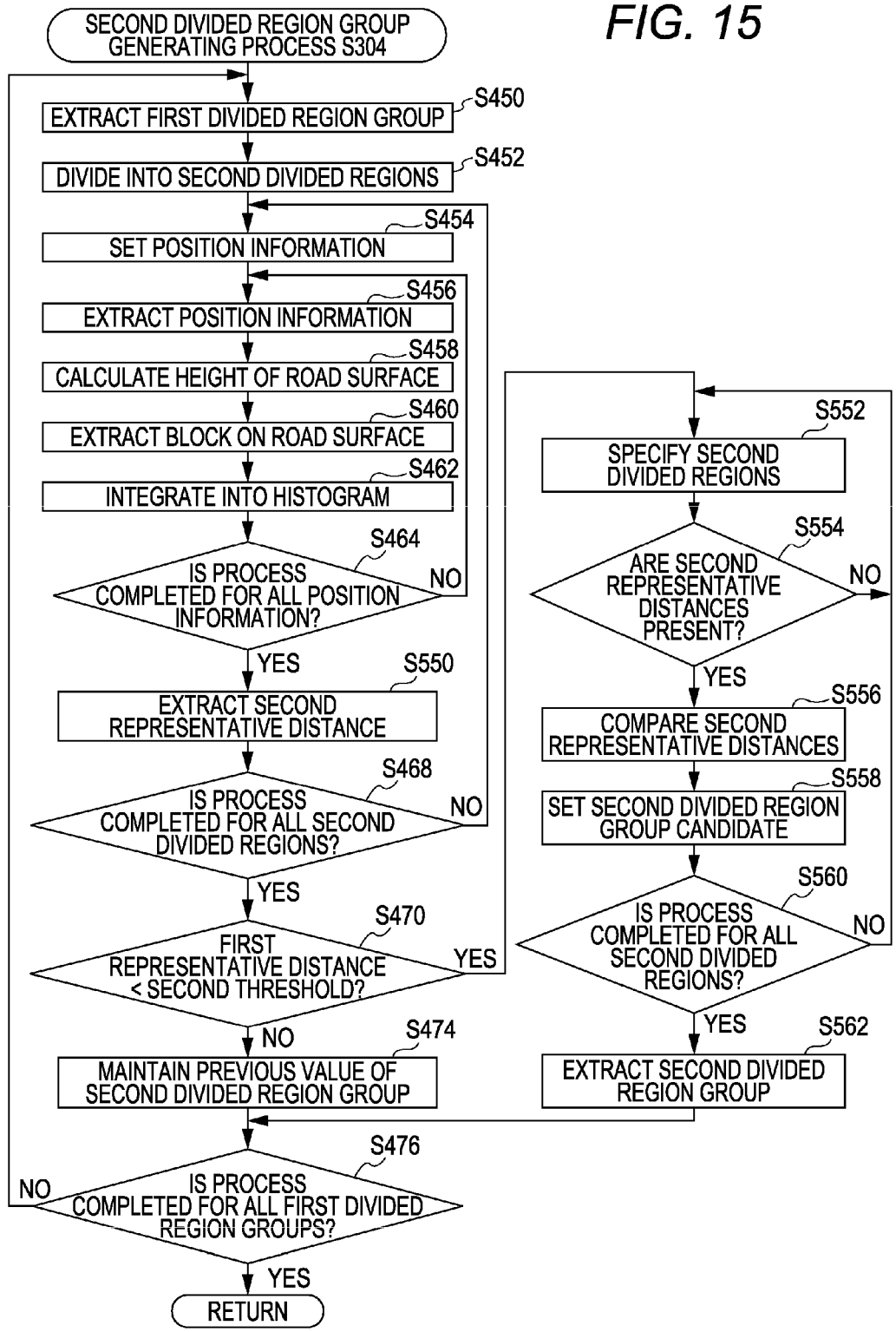
FIG. 15 is a flowchart showing a flow of a second divided region group generating process.

Referring to FIG. 15, the first divided region group 222 is extracted (S450), and a histogram of second divided regions 230 obtained by division in the vertical direction is generated (S462). The second representative distance deriving unit 532 refers to the generated histogram, and determines that a relative distance corresponding to a zone where the frequency of the histogram (the number of relative distances) is equal to or larger than a predetermined threshold (set as appropriate) and the largest as the second relative distance (S550). Although the maximum value of the histogram is simply defined as the second representative distance herein, the predetermined threshold may be set to vary depending on the relative distance so that a block with a shorter relative distance, that is, a block assumed to be located closer is preferentially extracted as the second representative distance.

If the second representative distances 540 are derived for all of the second divided regions 230 (YES in S468) and the first representative distance 214 is determined to be smaller than the second threshold (YES in S470), the process proceeds to a second divided region specifying process S552.

The second divided region group generating unit 534 specifies any second divided region 230 from a plurality of second divided regions 230 sequentially from the bottom in the vertical direction, for example, and also specifies a second divided region 230 adjacent to the any second divided region 230 on the upper side thereof in the vertical direction (S552). The second divided region group generating unit 534 then determines whether or not a second representative distance 540 is present in each of the specified second divided regions 230 (S554). If no second representative distance 540 is present in both the second divided regions 230 (NO in S554), the second divided region specifying process S552 and subsequent processes are repeated for next second divided regions 230. On the other hand, if a second representative distance 540 is present in each of the second divided regions 230 (YES in S554), the second representative distances 540 of both the second divided regions 230 are compared (S556).

If the difference between the second representative distances 540 is equal to or smaller than a predetermined threshold (a value at which the distance are determined to be of the same three-dimensional object), the second representative distances 540 are regarded to be close. The second divided region group generating unit 534 groups the first divided regions 210 having first representative distances between which the difference is equal to or smaller than a predetermined threshold, and sets the second divided regions 230 having the grouped second representative distances 540 as the second divided region group candidate 542 (S558). In this process, if one of the second divided regions 230 is already set as a second divided region group candidate 542, the other second divided region 230 is integrated in the second divided region group candidate 542.

In the grouping, a relative positional relationship of a plurality of groups is further determined. For example, when positions of endpoints are close to each other and transitions of relative distances in the horizontal direction and the vertical direction in three-dimensional objects are substantially equal (continuous) among groups of three-dimensional objects of a same type, the groups are determined to represent a same surface of same three-dimensional objects and are integrated into one group. In this process, the transitions of the relative distances in the horizontal direction and the vertical direction in the three-dimensional objects can be defined by approximation straight lines obtained by the Hough transform or the least squares method. In the case of a preceding vehicle, a plurality of groups can be integrated into one group also based on the fact that the relative moving speeds with respect to the z coordinates are equal.

Then, the second divided region group generating unit 534 determines whether the generation of the second divided region group candidate 542 is performed for all of the plurality of second divided regions 230 (S560). If the generation of the second divided region group candidate 542 is not completed for all of the second divided regions 230 (NO in S560), the specifying process S552 and subsequent processes are repeated for new second divided regions 230. On the other hand, if the generation is completed for all of the second divided regions 230 (YES in S560), the second divided region group generating unit 534 extracts a second divided region group candidate 542 having a relative distance that is the shortest and whose difference from the first representative distance 214 is equal to or smaller than the first threshold from the second divided region group candidates 542 as a second divided region group 234 (S562).

Finally, the second divided region generating unit 534 determines whether the generation of the second divided region group is performed for all of the plurality of set first divided region groups 222 (S476). If the generation is performed for all of the first divided regions 210 (YES in S476), the second divided region group generating process S304 is terminated.

As described above, according to the vehicle exterior monitoring device 530, a three-dimensional object immediately in front of the subject vehicle 1 can be correctly recognized even when there is a plurality of relative distances that are peak candidates in the distance distribution, by deriving the first representative distance 214 only for the vertical range. Moreover, in the second embodiment, since a three-dimensional object located immediately in front of the subject vehicle 1 is always specified in generating a second divided region group 234, a three-dimensional object can be more correctly recognized. In addition, it is needless to say that the configuration similar to that in the first embodiment can produce the same operation and effects in the second embodiment as in the first embodiment.

There are also provided programs for making a computer system function as the vehicle exterior monitoring devices 130 and 530, and a computer-readable storage medium such as a flexible disk, a magneto-optical disc, a ROM, a CD, a DVD and a BD having recorded thereon such programs. Note that a program refers to data processing means described by a certain language and a certain describing method.

While some preferred embodiments of the present invention have been described with reference to the drawings, the present invention is of course not limited to the embodiments. Those skilled in the art will appreciate that various variations and modifications can be conceived within the scope described in the claims, and that such variations and modifications are within the technical scope of the present invention.

Although the configurations of the first and second embodiments have been described separately above, these may be exclusively operated in parallel. For example, a second divided region group 234 may be normally generated based on a first representative distance 214, a second representative distance 540 may be regularly obtained according to the second embodiment, and a three-dimensional object located immediately in front of the vehicle 1 may be specified to correct the positional relationship with the three-dimensional object in the forward-back direction.

As described above, in the process of generating a second divided region group 234 according to the first embodiment, the processing load can be reduced by generating the second divided region group 234 based on the first representative distance 214, and in the process of generating a second divided region group 234 according to the second embodiment, a three-dimensional object located immediately in front of the subject vehicle 1 can be appropriately derived. Accordingly, the process of generating a second divided region group 234 based on the second embodiment is intermittently performed so as to correctly recognize the positional relationship between the subject vehicle 1 and a three-dimensional object located immediately in front. In addition, the process of generating a second divided region group 234 based on the first embodiment is normally performed based on the positional relationship thus obtained to extract a predetermined three-dimensional object. In this manner, it is possible to increase the accuracy of detecting a three-dimensional object immediately in front while reducing the processing load.

Although the three-dimensional position of a three-dimensional object is derived by using a plurality of image capturing devices 110 and based on a parallax between image data in the embodiments described above, the manner in which the position is derived is not limited thereto. For example, various known distance measuring devices such as a laser radar distance measuring device can be used. A laser radar distance measuring device projects a laser beam to a detected region 122, receives light that is the laser beam reflected by an object, and measures the distance to the object based on the time taken therefor.

Furthermore, an example in which the position information obtaining unit 160 receives parallax information from the image processing device 120 and generates three-dimensional position information is presented in the embodiments described above. Alternatively, however, the image processing device 120 may generate three-dimensional position information in advance and the position information obtaining unit 160 may obtain the generated three-dimensional position information. In this manner, it is possible to distribute the functions to reduce the processing loads on the vehicle exterior monitoring devices 130 and 530.

Furthermore, the position information obtaining unit 160, the first representative distance deriving unit 162, the first divided region group generating unit 164, the second divided region group generating units 166 and 534, and the second representative distance deriving unit 532 are configured to operate by means of software by the central control unit 154 in the embodiments described above. However, the aforementioned functional units can also be configured by means of hardware.

Furthermore, the first representative distance deriving unit 162 uses the peak value in the distance distribution 212 of relative distances in the first divided region 210 as the first representative distance 214 in the embodiments described above. In the present embodiment, however, since the target range can be limited to the vertical range, any one of an average value of relative distances in the vertical range, a median of relative distances in the vertical range and the shortest relative distance in the vertical range may be used as the first representative distance. Since the first representative distance can be readily derived with such a configuration, the processing load can be reduced.

Note that the processes of the vehicle exterior monitoring method described herein do not necessarily be processed in time series in the order described in the flowcharts, and may be processed in parallel or may include processes in subroutines.

The present invention can be employed in a vehicle exterior monitoring device and a vehicle exterior monitoring method for monitoring vehicle exterior condition based on distance distribution of three-dimensional objects located outside of a subject vehicle with respect to the subject vehicle.

What is claimed is:

1. A vehicle exterior monitoring device comprising:
a position information obtaining unit that obtains position information of a three-dimensional object present in a detected region, the position information including a relative distance with respect to a subject vehicle;
a first representative distance deriving unit that divides the detected region with respect to an horizontal direction into a plurality of first divided regions, and derives a first representative distance corresponding to a peak in distance distribution of each of the first divided regions based on the position information;
a first divided region group generating unit that groups the first divided regions based on the first representative distance to generate one or more first divided region groups; and
a second divided region group generating unit that divides the first divided region group with respect to the vertical direction into a plurality of second divided regions and groups second divided region groups having relative distances close to the first representative distance to generate a second divided region group, wherein
the first representative distance deriving unit limits a target range for which the first representative distance is derived within the first divided region group in which the second divided region group is generated to a vertical range corresponding to the second divided region group.

2. The vehicle exterior monitoring device according to claim 1, wherein the second divided region group generating unit groups the second divided regions when a predetermined proportion of relative distances close to the first representative distance with respect to the total number of relative distances in the second divided region are included.

3. A vehicle exterior monitoring device comprising:
a position information obtaining unit that obtains position information of a three-dimensional object present in a detected region, the position information including a relative distance with respect to a subject vehicle;
a first representative distance deriving unit that divides the detected region with respect to an horizontal direction into a plurality of first divided regions, and derives a first representative distance corresponding to a peak in distance distribution of each of the first divided regions based on the position information;
a first divided region group generating unit that groups the first divided regions based on the first representative distance to generate one or more first divided region groups;

a second representative distance deriving unit that divides the first divided region group with respect to a vertical direction into a plurality of second divided regions, and derives a second representative distance corresponding to a peak in distance distribution of each of the second divided regions based on the position information; and a second divided region group generating unit that groups the second divided region groups based on the second representative distance to generate a second divided region group that has a relative distance that is the shortest and whose difference from the first representative distance is equal to or smaller than a first threshold, wherein the first representative distance deriving unit limits a target range for which the first representative distance is derived within the first divided region group in which the second divided region group is generated to a vertical range corresponding to the second divided region group.

4. A vehicle exterior monitoring device comprising:
a position information obtaining unit configured to obtain position information of a three-dimensional object present in a detected region, the position information including a relative distance with respect to a subject vehicle;
a first representative distance deriving unit configured to divide the detected region with respect to an horizontal direction into a plurality of first divided regions, and derive a first representative distance corresponding to a peak in distance distribution of each of the first divided regions based on the position information;
a first divided region group generating unit configured to group the first divided regions based on the first representative distance to generate one or more first divided region groups; and
a second divided region group generating unit configured to divide the first divided region group with respect to the vertical direction into a plurality of second divided regions, and exclusively perform a process of grouping second divided region groups having relative distances close to the first representative distance to generate a second divided region group and a process of grouping the second divided regions based on a second representative distance corresponding to a peak in distance distribution of each of the second divided regions to generate a second divided region group having such a relative distance that is the shortest and that a difference between the first representative distance and the relative distance is equal to or smaller than a first threshold, wherein the first representative distance deriving unit limits a target range for which the first representative distance is derived within the first divided region group in which the second divided region group is generated to a vertical range corresponding to the second divided region group.

5. The vehicle exterior monitoring device according to claim 1, wherein the first representative distance deriving unit limits the target range to the respective vertical range independently for each of the first divided region group in which the second divided region group is generated.

6. The vehicle exterior monitoring device according to claim 1, wherein the first representative distance deriving unit uses any one of an average value of relative distances within the vertical range, a median of relative distances within the vertical range and a shortest relative distance within the vertical range as the first representative distance.

7. The vehicle exterior monitoring device according to claim 1, wherein the second divided region group generating unit sets the vertical range to a range that is extended by a predetermined area.

8. The vehicle exterior monitoring device according to claim 1, wherein the second divided region group generating unit sets the vertical range to a range extended to a lower end of the first divided region group.

9. The vehicle exterior monitoring device according to claim 1, wherein the second divided region group generating unit does not update the vertical range when the first representative distance is equal to or larger than a second threshold.

10. A vehicle exterior monitoring method comprising:
obtaining position information of a three-dimensional object present in a detected region, the position information including a relative distance with respect to a subject vehicle;
dividing the detected region with respect to a horizontal direction into a plurality of first divided regions;
deriving a first representative distance corresponding to a peak in distance distribution of each of the first divided regions based on the position information;
grouping the first divided regions based on the first representative distance to generate one or more first divided region groups;
dividing the first divided region group with respect to the vertical direction into a plurality of second divided regions and grouping second divided region groups having relative distances close to the first representative distance to generate a second divided region group; and
limiting a target region for which the first representative distance is derived within the first divided region group in which the second divided region group is generated to a vertical range corresponding to the second divided region group.

11. A vehicle exterior monitoring method comprising:
obtaining position information of a three-dimensional object present in a detected region, the position information including a relative distance with respect to a subject vehicle;
dividing the detected region with respect to a horizontal direction into a plurality of first divided regions;
deriving a first representative distance corresponding to a peak in distance distribution of each of the first divided regions based on the position information;
grouping, the first divided regions based on the first representative distance to generate one or more first divided region groups;
dividing the first divided region group with respect to a vertical direction into a plurality of second divided regions, and deriving a second representative distance corresponding to a peak in distance distribution of each of the second divided regions based on the position information;
grouping the second divided region groups based on the second representative distance to generate a second divided region group that has a relative distance that is the shortest and whose difference from the first representative distance is equal to or smaller than a first threshold; and
limiting a target region for which the first representative distance is derived within the first divided region group in which the second divided region group is generated to a vertical range corresponding to the second divided region group.

* * * * *